US010368297B2

(12) United States Patent
Lindheimer et al.

(10) Patent No.: US 10,368,297 B2
(45) Date of Patent: Jul. 30, 2019

(54) METHODS, SYSTEMS AND COMPUTER PROGRAM PRODUCTS FOR NETWORK-CONTROLLED SELECTION OF RADIO ACCESS NETWORKS

(71) Applicant: TELEFONAKTIEBOLAGET L M ERICSSON (PUBL), Stockholm (SE)

(72) Inventors: Christofer Lindheimer, Linköping (SE); Gunnar Mildh, Sollentuna (SE); Håkan Persson, Solna (SE); Stefan Rommer, Västra Frölunda (SE); Ivo Sedlacek, Hovorcovice (CZ); Oumer Teyeb, Solna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 352 days.

(21) Appl. No.: 14/892,377

(22) PCT Filed: Jan. 15, 2014

(86) PCT No.: PCT/SE2014/050035
§ 371 (c)(1),
(2) Date: Nov. 19, 2015

(87) PCT Pub. No.: WO2014/189428
PCT Pub. Date: Nov. 27, 2014

(65) Prior Publication Data
US 2016/0095050 A1 Mar. 31, 2016

Related U.S. Application Data

(60) Provisional application No. 61/825,388, filed on May 20, 2013.

(51) Int. Cl.
*H04W 48/14* (2009.01)
*H04W 48/16* (2009.01)
(Continued)

(52) U.S. Cl.
CPC ........... *H04W 48/14* (2013.01); *H04W 48/06* (2013.01); *H04W 48/16* (2013.01); *H04W 48/18* (2013.01); *H04W 88/06* (2013.01)

(58) Field of Classification Search
CPC ....... H04W 48/14; H04W 8/02; H04W 48/04; H04W 48/06; H04W 48/18; H04W 48/20
See application file for complete search history.

(56) References Cited

U.S. PATENT DOCUMENTS

2004/0162077 A1* 8/2004 Kauranen ............. H04W 48/18
455/445
2007/0153728 A1* 7/2007 Le ......................... H04W 36/06
370/329
(Continued)

FOREIGN PATENT DOCUMENTS

WO 2012/092935 A1 7/2012
WO 2014148969 A1 9/2014
(Continued)

OTHER PUBLICATIONS

"IEEE 802.11," Wikipedia, Jan. 18, 2013, 10 pages, https://web.archive.org/web/20130118083136/http://en.wikipedia.org/wiki/IEEE_802.11.
(Continued)

*Primary Examiner* — Anthony S Addy
*Assistant Examiner* — Xiang Zhang
(74) *Attorney, Agent, or Firm* — Rothwell, Figg, Ernst & Manbeck, p.c.

(57) ABSTRACT

There is provided a method of operating a wireless communication device to facilitate selection among a set of two or more radio access networks, RANs, the wireless communication device being served by one of the RANs in the set, the method comprising receiving (1010) a network selection policy from a server; evaluating (1020) the network selection policy; and transmitting (1030) information
(Continued)

indicating a result of the evaluation of the network selection policy to the RAN serving the wireless communication device.

15 Claims, 12 Drawing Sheets

(51) Int. Cl.
*H04W 48/18* (2009.01)
*H04W 48/06* (2009.01)
*H04W 88/06* (2009.01)

(56) References Cited

U.S. PATENT DOCUMENTS

| | | | | |
|---|---|---|---|---|
| 2007/0293263 | A1* | 12/2007 | Eslambolchi | H04W 88/10 455/552.1 |
| 2010/0234042 | A1* | 9/2010 | Chan | H04W 36/0061 455/453 |
| 2011/0044253 | A1* | 2/2011 | Zisimopoulos | H04W 48/16 370/328 |
| 2011/0261786 | A1* | 10/2011 | Bontu | H04W 48/02 370/331 |
| 2012/0115487 | A1* | 5/2012 | Josso | H04W 36/30 455/437 |
| 2013/0203435 | A1* | 8/2013 | Smith | H04W 16/14 455/454 |
| 2013/0310036 | A1* | 11/2013 | Molloy | H04W 36/14 455/436 |
| 2014/0113628 | A1* | 4/2014 | Sundararajan | H04W 48/18 455/435.2 |
| 2014/0295913 | A1* | 10/2014 | Gupta | H04W 74/02 455/552.1 |

FOREIGN PATENT DOCUMENTS

| | | |
|---|---|---|
| WO | 2014148970 A1 | 9/2014 |
| WO | 2014/177208 A1 | 11/2014 |
| WO | 2014182210 A1 | 11/2014 |

OTHER PUBLICATIONS

3rd Generation Partnership Project; Technical Specification Group Services and System Aspects; Architecture Enhancements for non-3GPP accesses (Release 8), 3GPP TS 23.402 V1.4.0, Oct. 2007, 125 pages.

3rd Generation Partnership Project; Technical Specification Group Core Network and Terminals; Access Network Discovery and Selection Function (ANDSF); Management Object (MO); (Release 11), 3GPP TS 24.312, V11.6.0, Mar. 2013, 173 pages.

Intel Corporation, "New Study Item Proposal on WLAN/3GPP Radio Interworking," RP-122038, 3GPP TSG-RAN Meeting #58, Dec. 2012, 6 pages.

3rd Generation Partnership Project; Technical Specification Group Radio Access Network; Study on WLAN/3GPP radio interworking (Release 12), 3GPP TR 37.834 V2.0.0. Nov. 2013, 19 pages.

Huawei, "WLAN network selection enhancement," 3GPP TSG-RAN GW2 #81bis, Agenda item 5.1, R-131366, Apr. 2013, 3 pages.

Alcatel-Lucent, "Policy based terminal triggered, ANDSF decided access selection," 3GPP TSG SA WG2 Architecture—S2#63, S2-081658, Feb. 2008, 6 pages.

Huawei, "[81bis#12][Joint/WiFi] Relation of RAN mechanisms to ANDSF," 3GPP TSG-RAN WG2 Meeting #82, R2-131623, May 2014, 20 pages.

Internatonal Search Report and Written Opinion issued in corresponding International Application No. PCT/SE2014/050035, dated Oct. 13, 2014, 13 pages.

Supplementary European Search Report issued in related Application No. EP14801219.8, dated Dec. 2, 2016, 4 pages.

Broadcom Corporation, "On CN baseline for WLAN/3GPP Radio Interworking solutions," 3GPP TSG-RAN WG2 Meeting #81-BIS, R2-130993, Apr. 15-19, 2013, 5 pages.

* cited by examiner

METHODS, SYSTEMS AND COMPUTER PROGRAM PRODUCTS FOR NETWORK-CONTROLLED SELECTION OF RADIO ACCESS NETWORKS

CROSS REFERENCE TO RELATED APPLICATION(S)

This application is a 35 U.S.C. § 371 National Phase Entry Application from PCT/SE2014/050035, filed Jan. 15, 2014, which claims priority to U.S. Application No. 61/825,388, filed May 20, 2013. The above identified applications are incorporated by reference.

TECHNICAL FIELD

This disclosure relates to systems, methods and computer program products for selecting between different radio access networks (RANs) for access by a wireless communication device ("WCD").

BACKGROUND

In IEEE, Wi-Fi™ (also known as wireless local area network (WLAN); these terms will be used interchangeably throughout this document) is standardized in the IEEE 802.11 specifications (IEEE Standard for Information technology—Telecommunications and information exchange between systems. Local and metropolitan area networks—Specific requirements. Part 11: Wireless LAN Medium Access Control (MAC) and Physical Layer (PHY) Specifications). Wi-Fi™ is a technology that currently mainly operates on the 2.4 GHz or the 5 GHz band.

The IEEE 802.11 specifications regulate the STA (station, access points or wireless terminals) physical layer, MAC layer and other aspects to secure compatibility and interoperability between access points and WCDs, (hereinafter referred to as user equipments (UEs)). Wi-Fi™ is generally operated in unlicensed bands, and as such, communication over Wi-Fi™ may be subject to interference sources from any number of both known and unknown devices. Wi-Fi™ is commonly used as wireless extensions to fixed broadband access, e.g., in domestic environments and hotspots, like airports, train stations and restaurants.

Recently, Wi-Fi™ has been subject to increased interest from cellular network operators, not only as an extension to fixed broadband access. The interest is mainly about using the Wi-Fi™ technology as an extension or alternative to cellular radio access network technologies to handle the always increasing wireless bandwidth demands. Cellular operators that are currently serving mobile users with, e.g., any of the 3$^{rd}$ Generation Partnership (3GPP) technologies (e.g., Long Term Evolution (LTE), Universal Mobile Telecommunications System (UMTS)/Wideband Code Division Multiple Access (WCDMA), High Speed Packet Access (HSPA) or Global System for Mobile Communications (GSM)) see Wi-Fi™ as a wireless technology that can provide good support in their regular cellular networks. The term "operator-controlled Wi-Fi" points to a Wi-Fi™ deployment that on some level is integrated with a cellular network operator of an existing network. In some cases, the 3GPP radio access networks and the Wi-Fi™ wireless access network may even be connected to the same core network and provide the same services.

There is currently quite intense activity in the area of operator-controlled Wi-Fi in several standardization organizations. In 3GPP, activities to connect Wi-Fi™ access points to the 3GPP-specified core network is pursued, and in the Wi-Fi alliance (WFA) activities related to certification of Wi-Fi™ products are undertaken, which to some extent also is driven from the need to make Wi-Fi™ a viable wireless technology for cellular operators to support high bandwidth offerings in their networks. The term Wi-Fi™ offload is commonly used to refer to cellular network operators seeking to offload traffic from their cellular networks to Wi-Fi™, e.g., in peak-traffic-hours and in situations when the cellular network for one reason or another needs to be off-loaded (e.g., to provide requested quality of service, maximize bandwidth or simply for coverage).

For a wireless operator, offering a mix of two technologies that are standardized in isolation from each other presents a challenge of providing intelligent mechanisms that interact with both technologies, such as connection management.

Most current Wi-Fi™ deployments are totally separate from mobile networks, and are to be seen as non-integrated. From the UE perspective, mobile operating systems may support a simple connection management mechanism, where the UEs immediately switch all their PS (Packet Switched) bearers to a Wi-Fi™ network upon a detection of such a network with a certain signal level. The decision to offload to a Wi-Fi™ or not is referred henceforth as "access selection strategy" and the aforementioned strategy of selecting Wi-Fi™ whenever such a network is detected is known as "Wi-Fi-if-coverage". While this may be a good strategy (e.g., for Wi-Fi™ deployed as extensions of a residential broadband connection to a fixed line operator), more is desired for mobile network operators that aim to integrate Wi-Fi as a component in their wireless networks.

In 3GPP, there have long been activities on an Access Network Discovery and Selection Function, hereinafter referred to as ANDSF. What ANDSF does is to provide policies to the UE from an ANDSF server (typically set by the operator of the currently visited or home network). These policies indicate priorities that the UE should follow when selecting an access network. For example a policy could include information to indicate that, in a certain area at a certain point in time, WLAN/Wi-Fi is preferred over a 3GPP access network. With an ANDSF server, the operator can thus distribute policies to UEs to steer access selection.

ANDSF is further described in, e.g., 3GPP TS 23.402, Architecture enhancements for non-3GPP accesses and TS 24.312, Access Network Discovery and Selection Function (ANDSF) Management Object (MO), the entire content of which is incorporated by reference herein.

As previously stated, selecting a Wi-Fi™ access point has always been executed in the UE. ANDSF does not change this, but adds a possibility to indicate a policy or preference of access selection or RAN selection based on e.g., a geographical, chronological, service or subscriber perspective. It is up to the UE to interpret and act on the policies and select an access network in either e.g., 3GPP, WLAN, WiMAX™, code division multiple access (CDMA). In 3GPP TS 24.312, all the different elements that are possible to indicate are listed. It should be noted that if a user is manually adding preferences (e.g., adding a home access point that extend a fixed broadband connection or similar as a preferred access point) then this manual configuration is expected to override any other access network selection procedure, be it ANDSF rules, algorithms in the UE's operating system, connection manager, or network controlled selection schemes.

One challenge with the ANDSF solution is that it is not set up to have any connection to any Radio Access Network (RAN) conditions. Thus, ANDSF has no support in the standard for conveniently following, for example, dynamic changes of radio conditions in the RAN. It would be good if decisions about traffic steering of a UE to either 3GPP or Wi-Fi™ could be based on more instantaneous and dynamic information about radio conditions, such that users are not unnecessarily sent to a congested access point or access technology.

Another issue that has been identified with ANDSF is that since it leaves the execution of the policies to the UE, it is not predictable (from a radio network perspective) how a UE will move between access networks, making it more difficult to optimize radio network performance.

To overcome these and other shortcomings with the ANDSF solution, a radio access network (RAN) controlled traffic steering is currently being discussed in 3GPP in relation to a study item called 3GPP/WLAN Interworking, described in 3GPP TR 37.834 Study on 3GPP/WLAN Radio Interworking and in study item description RP-122038 in 3GPP. Therein is stated that one of the objectives with a new solution is that it should be able to take dynamically changing conditions (e.g., radio access network load and performance) into account. One of the solution proposals discussed is a RAN controlled approach. With a RAN-controlled access selection, it is the network (and not the UE) that makes the decision on what access link to use for communication to or from a UE. The RAN control of traffic steering should be able to capture the dynamics in varying radio conditions as well as provide predictability to better be able to optimize radio access network performance as well as user performance.

One aspect of introducing a RAN-controlled solution for traffic steering is that of co-existence of a RAN-based, network-controlled traffic steering solution and an ANDSF-based solution. Thus, there is a question of how to harmonize a solution that fundamentally is based on the UE executing decisions and a solution that is network-controlled and network-enforced.

This question is also mentioned in the study item description referred to above and solutions that have been discussed have been to steer on different parameters and variables. For example, ANDSF could provide information that is static or semi-static in nature, and functionality in the RAN could provide more dynamic information to the UE. The problem with this approach is that the network would not ultimately be in control of the decisions as long as the final evaluation and execution is made in the UE.

Another approach has been to say that whatever solution the radio access network suggests in terms of controlling a UE's access in getting service shall override ANDSF policies if they are incompatible. This however is not optimal either, as there is information on different levels in the network and it is challenging for a RAN control to keep updated on, e.g., core network or service network information that may be relevant for traffic steering. This level of information could typically be reflected in ANDSF policies whereas it would go against what a radio network should handle to have to provide or update that knowledge to the RAN.

Thus there is a need for a traffic steering solution that can combine an ANDSF function with a network-controlled RAN solution, such that dynamics from RAN can be captured as well as policies related to services or subscriptions. For network optimization purposes, it is important to maintain the network control and predictability that such solutions offer.

Various Aspects and Embodiments that aim to address these needs are described below.

SUMMARY

The embodiments below address a way of optimizing selection of radio access networks (RANs); for example, selecting between accessing a cellular RAN (e.g., a particular eNodeB (eNB) or NodeB (NB)) and accessing a WLAN RAN (e.g., Wi-Fi™ or WiMAX™ access point). As noted above, a UE may currently be programmed to switch from using an air interface provided by a cellular RAN to using an air interface provided by a WLAN RAN whenever the WLAN RAN is detected. To give network operators more control over this RAN selection by a UE, UE's have also been programmed to base its RAN selection on one or more access network discovery and service function (ANDSF) policies. The network operator may influence the UE's RAN selection through configuring one or more ANDSF policies, which are distributed to the UE from an ANDSF server.

As discussed above, the use of ANDSF policies in RAN selection still leaves the cellular network uncertain as to what RAN the UE will ultimately select to use to gain network connectivity. Further, because the ANDSF server may not track dynamic radio conditions (e.g., load or signal quality), a RAN selection based solely on ANDSF policies may still lack all the relevant information.

Because RANs themselves may have access to information on such dynamic conditions, control of RAN selection may be placed with a RAN (e.g., with the 3GPP cellular network) instead of the UE. However, because the RAN may be unaware of ANDSF policies, this network-controlled selection may then fail to account for ANDSF policies. Moreover, from a design perspective, the RAN is ultimately concerned with providing radio access, and should not be required to be aware of ANDSF policies. Thus, even if details of one or more ANDSF policies are relayed to the RAN, it may fail to understand such details.

The present disclosure addresses this problem by tasking the UE with evaluating an ANDSF policy to identify a particular RAN (the RAN identified as a result of evaluating the ANDSF policy may be referred to as the "Policy selected RAN"). The solution, however, lets a RAN (e.g., a network node (e.g., eNB) of the RAN) retain ultimate control over deciding which RAN the UE will use to gain network connectivity. Such a RAN is referred to herein as a "controlling RAN". In this solution, the UE may transmit information to the controlling RAN (e.g., to a RAN controller (a network node, such as eNB, NB or radio network controller (RNC)) of the controlling RAN) that indicates a result of the evaluation of the ANDSF policy. This information transmitted by the UE may identify the Policy selected RAN. This allows the UE to be responsible for interacting with ANDSF policies and to present an outcome of such policies to the controlling RAN. Because the controlling RAN receives the outcome of the ANDSF policies, it does not need to understand specific details of such policies.

The controlling RAN may then decide whether to reject or accept the outcome of the ANDSF policies. The controlling RANs decision on RAN selection thus indirectly takes into account the ANDSF policies. More particularly, the controlling RAN may choose to control the UE to switch to the Policy selected RAN, or may choose to override the selection of the ANDSF policy by causing the UE to use a RAN different than the Policy selected RAN.

In one aspect of the present disclosure, a method, system, and computer program product is provided for steering traffic to and from a UE by a controlling RAN, where the UE reports to the controlling RAN the result of evaluation of ANDSF policies as signalled from the ANDSF server to the UE. The UE evaluation of ANDSF policies are done in a way similar to what the UE would have done if there were no RAN traffic steering present. However, instead of acting on the ANDSF policy evaluation in the UE, the UE sends the results of the evaluation to the controlling RAN.

The result of the policy evaluation is sent (e.g., as an evaluation report) to the controlling RAN to indicate the RAN that would have been selected if the UE considers only ANDSF policies. With this evaluation of ANDSF policies in the UE and possibly additional information that is available in the network, the controlling RAN will decide if the ANDSF policy evaluated indication of access should be followed or if another decision should be taken.

The evaluation report from the UE may also include evaluations of other access options, such as various access points, 3GPP networks or Wi-Fi networks that the controlling RAN has requested information on from the UE. The decision from the controlling RAN could include a decision to keep the UE in its current access network, delaying the selection of the access network identified by the ANDSF policy evaluation until some point in the future, (e.g. it might be possible that at the particular time the access link selected by ANDSF might be congested or the signal quality towards the UE was bad, which are factors currently not considered in ANDSF policies), or some other decision.

If the decision is to delay the selection of the access network indicated by the policy evaluation, the access network might be chosen later on when the radio condition of the UE has improved, when the conditions has deteriorated in the RAN currently used by the UE, when ongoing services are completed, when the UE mobility pattern has changed, or based on some other event. The controlling RAN could also decide to move only some services to the Policy selected RAN. The network could also decide to move the UE to an access network that is different than the Policy selected RAN.

In one aspect of the present disclosure, the ANDSF policy evaluation results sent from the UE to the controlling RAN includes an indication of whether there are certain types of traffic or bearer realizations of traffic that should not be routed over a specific access technology.

In one aspect of the present disclosure, the ANDSF policy evaluation results sent from the UE to the controlling RAN includes an indication on certain types of traffic or bearer realizations of traffic that should be routed over a specific access technology or a specific access provider if the UE is connected to a 3GPP network that is not its home 3GPP network.

In one aspect of the present disclosure, the ANDSF policy evaluation results sent from the UE to the controlling RAN includes quality indications related to the Policy selected RAN, such that the controlling RAN may more accurately consider the Policy selected RAN when compared with access networks that the controlling RAN has suggested or requested information from the UE on. This information could include radio performance measurements as well as other information about the access networks like cell load, number of connected UEs, interference levels, backhaul limitation/load, etc.

In one aspect of the present disclosure, when requested by the controlling RAN (e.g., the 3GPP RAN that the UE is serving the UE), the UE performs measurements on available access points and arranges them in a list based on a quality measure indicated by the controlling RAN. The indication from the controlling RAN could be either all inclusive (e.g. list all access points (APs) the UE can hear) or it can be specific (e.g. list only APs with which the UE has a signal strength/quality above a certain threshold or/and APs that advertise a load level lower than a certain threshold, etc.). The UE further evaluates an ANDSF policy to determine a Policy selected RAN and adds to the list the Policy selected RAN. The complete list or a sub-set of the list is then sent to the controlling RAN for further evaluation and the steering decision is then subsequently returned to the UE from the controlling RAN.

In one aspect of the present disclosure, the trigger to send an evaluation report from the UE to controlling RAN is initiated by evaluation of ANDSF policies in the UE that would result in a change of access compared to the current access. For example, if an ANDSF policy evaluation in the UE would not result in any changes in access networks for any UE bearers or flows, an evaluation report would not be sent to the controlling RAN. On the other hand, if the Policy selected RAN is different than a RAN that the UE is currently using for the bearer or flow, then the UE will send the evaluation report to the controlling RAN.

Example aspects and embodiments of some of the techniques disclosed herein are described below. However, it should be understood that the list of example aspects and embodiments is not intended to be an exhaustive representation of the aspects and embodiments disclosed herein.

According to a first aspect, there is provided a method of operating a wireless communication device to facilitate selection among a set of two or more radio access networks, RANs, the wireless communication device being served by one of the RANs in the set, the method comprising receiving a network selection policy from a server; evaluating the network selection policy; and transmitting information indicating a result of the evaluation of the network selection policy to the RAN serving the wireless communication device.

In some embodiments the network selection policy is an Access Network Discovery and Selection Function, ANDSF, policy from an ANDSF server.

In some embodiments the network selection policy identifies a selection priority among the set of two or more RANs. In some embodiments the set of RANs comprises two or more of: one or more 3GPP cellular RANs, a non-3GPP type of cellular RAN, an IEEE 802.11-based RAN or an IEEE 802.16-based RAN.

In some embodiments the step of evaluating comprises evaluating the network selection policy to identify a particular RAN in the set.

In some embodiments the step of receiving comprises receiving a first network selection policy that prioritizes selection among the set of RANs based on a network access time or based on a location of one or more of the set of RANs; receiving a second network selection policy that prioritizes selection among the set of RANs based on a signal strength or signal quality of one or more of the set of RANs; and receiving a third network selection policy that prioritizes selection among the set of RANs based on a load experienced by one or more of the set of RANs; and wherein the step of evaluating comprises evaluating one or more of the first network selection policy, the second network selection policy and the third network selection policy.

In some embodiments the method further comprises the step of receiving information from the RAN serving the wireless communication device concerning the selection of a RAN for the wireless communication device.

In some embodiments the information received from the RAN serving the wireless communication device comprises an indication of whether the result of the evaluation of the network selection policy is rejected.

In some embodiments, in the event that the information comprises an indication that the result of the evaluation of the network selection policy is rejected, the information further comprises one or more conditions that are to be satisfied before the result of the evaluation of the network selection policy can be accepted.

In some embodiments the method further comprises the steps of monitoring the one or more conditions; and accessing the RAN indicated in the result of the evaluation of the network selection policy if the one or more conditions are satisfied.

In some embodiments the method further comprises the step of accessing the RAN indicated in the result of the evaluation of the network selection policy if the result of the evaluation of the network selection policy is not rejected.

In some embodiments, in the event that the information comprises an indication that the result of the evaluation of the network selection policy is rejected, the method further comprises the step of determining whether the information comprises an indication of another RAN to access; accessing said another RAN if the information comprises an indication of another RAN to access; and otherwise continuing to access the RAN serving the wireless communication device.

In some embodiments the method further comprises the step of receiving a message from the RAN serving the wireless communication device, the message requesting information about one or more of the set of RANs and indicating a criterion on when to perform the step of evaluating.

In some embodiments the information requested in the message comprises signal strength, signal quality, and/or load of one or more of the set of RANs.

In some embodiments the criterion indicates that the step of evaluating should not be started until a certain time or until a property of one or more of the set of RANs reaches a threshold.

In some embodiments the method further comprises the steps of determining whether the criterion for performing the step of evaluating is satisfied; if the criterion is satisfied, obtaining the information requested in the message; and transmitting the obtained information to the RAN serving the wireless communication device along with the information indicating the result of the evaluation of the network selection policy.

In other embodiments the information indicating a result of the evaluation of the network selection policy transmitted to the RAN serving the wireless communication device further comprises quality indications relating to the RAN indicated in the result of the evaluation.

In other embodiments the method further comprises the steps of performing measurements on available RANs; and arranging the available RANs in a list based on a quality measure; wherein the step of transmitting further comprises transmitting the list with the result of the evaluation of the network selection policy.

In some embodiments the information indicating a result of the evaluation of the network selection policy transmitted to the RAN serving the wireless communication device comprises an indication of whether there are certain types of traffic or bearer realizations of traffic that should not be routed over a specific RAN.

In some embodiments the step of transmitting is only performed if the result of the evaluation of the network selection policy indicates a change to the access of the wireless communication device to the RAN serving the wireless communication device.

According to a second aspect, there is provided a computer program product having computer readable code embodied therein, the computer readable code being configured such that, on execution by a suitable computer or processor, the computer or processor performs any of the methods described above.

According to a third aspect, there is provided a wireless communication device comprising a transceiver configured to communicate with a radio access network, RAN, serving the wireless communication device; and receive a network selection policy from a server; and one or more processors configured to facilitate selection among a set of two or more radio access networks, RANs, by evaluating the network selection policy; and transmitting, via the transceiver, information indicating a result of the evaluation of the network selection policy to the RAN serving the wireless communication device.

Various embodiments of the wireless communication device are also contemplated in which the wireless communication device is configured to implement the embodiments of the method of operating a wireless communication device described above.

According to a fourth aspect, there is provided a method of operating a radio access network, RAN, controller, the method comprising receiving from a wireless communication device information indicating a result of an evaluation of a network selection policy; determining whether to accept or reject the result of the evaluation of the network selection policy; and transmitting to the wireless communication device an indication that the result of the evaluation of the network selection policy is rejected if it is determined to reject the result of the evaluation of the network selection policy.

In some embodiments the network selection policy is an Access Network Discovery and Selection Function, ANDSF, policy.

In some embodiments the result of the evaluation of the network selection policy identifies a RAN in a set of two or more RANs. In some embodiments the set of RANs comprises two or more of: one or more 3GPP cellular RANs, a non-3GPP type of cellular RAN, an IEEE 802.11-based RAN or an IEEE 802.16-based RAN.

In some embodiments the method further comprises the step of transmitting to the wireless communication device an indication that the result of the evaluation of the network selection policy is accepted if it is determined to accept the result of the evaluation of the network selection policy.

In some embodiments the step of transmitting an indication that the result of the evaluation of the network selection policy is rejected further comprises transmitting one or more conditions that are to be satisfied before the result of the evaluation of the network selection policy can be accepted.

In some embodiments the step of transmitting an indication that the result of the evaluation of the network selection policy is rejected further comprises transmitting an indication of another RAN for the wireless communication device to access.

In some embodiments the step of determining whether to accept or reject the result of the evaluation of the network selection policy comprises assessing the current load of a RAN identified in the result of the evaluation of the network selection policy, or estimating the performance that the wireless communication device would experience from a RAN identified in the result of the evaluation of the network selection policy.

In other embodiments, the step of determining whether to accept or reject the result of the evaluation of the network selection policy comprises selecting an alternative RAN to a RAN indicated in the result of the evaluation of the network selection policy; estimating the performance that the wireless communication device would experience by accessing the RAN indicated in the result of the evaluation of the network selection policy; estimating the performance that the wireless communication device would experience by accessing the alternative RAN; determining whether a ratio of the estimated performance from accessing the RAN indicated in the result of the evaluation of the network selection policy to the estimated performance that the wireless communication device would experience by accessing the alternative RAN is greater than a threshold; accepting the result of the evaluation of the network selection policy if the ratio is greater than the threshold; and rejecting the result of the evaluation of the network selection policy if the ratio is not greater than the threshold.

In some embodiments the method further comprises the step of transmitting a message to the wireless communication device, the message requesting information about one or more of a set of RANs and indicating a criterion on when the wireless communication device is to evaluate the network selection policy.

In some embodiments the information requested in the message comprises signal strength, signal quality, and/or load of one or more of the set of RANs.

In some embodiments the criterion indicates that the evaluation of the network selection policy by the wireless communication device evaluating should not be started until a certain time or until a property of one or more of the set of RANs reaches a threshold.

In some embodiments the method further comprising the step of receiving the requested information from the wireless communication device about one or more of the set of RANs along with the information indicating the result of the evaluation of the network selection policy.

In other embodiments, the information indicating a result of the evaluation of the network selection policy received from the wireless communication device further comprises quality indications relating to the RAN indicated in the result of the evaluation.

In other embodiments the information indicating a result of the evaluation of the network selection policy received from the wireless communication device further comprises a list of available RANs.

In some embodiments the information indicating a result of the evaluation of the network selection policy received from the wireless communication device comprises an indication of whether there are certain types of traffic or bearer realizations of traffic that should not be routed over a specific RAN.

In some embodiments the RAN controller is part of an eNodeB, radio network controller or NodeB.

According to a fifth aspect, there is provided a computer program product having computer readable code embodied therein, the computer readable code being configured such that, on execution by a suitable computer or processor, the computer or processor performs any of the methods described above.

According to a sixth aspect, there is provided a radio access network, RAN, controller, comprising a transceiver configured to communicate with a wireless communication device; and receive from the wireless communication device information indicating a result of an evaluation of a network selection policy; and one or more processors configured to determine whether to accept or reject the result of the evaluation of the network selection policy; and transmit to the wireless communication device, via the transceiver, an indication that the result of the evaluation of the network selection policy is rejected if it is determined to reject the result of the evaluation of the network selection policy.

Various embodiments of the RAN controller are also contemplated in which the RAN controller is configured to implement the embodiments of the method of operating a RAN controller described above.

The above and other aspects and embodiments are described in further detail below.

BRIEF DESCRIPTION OF THE DRAWINGS

Features, objects and advantages of the present disclosure will become apparent to those skilled in the art by reading the following detailed description where references will be made to the appended figures in which.

DETAILED DESCRIPTION

Figure 1:
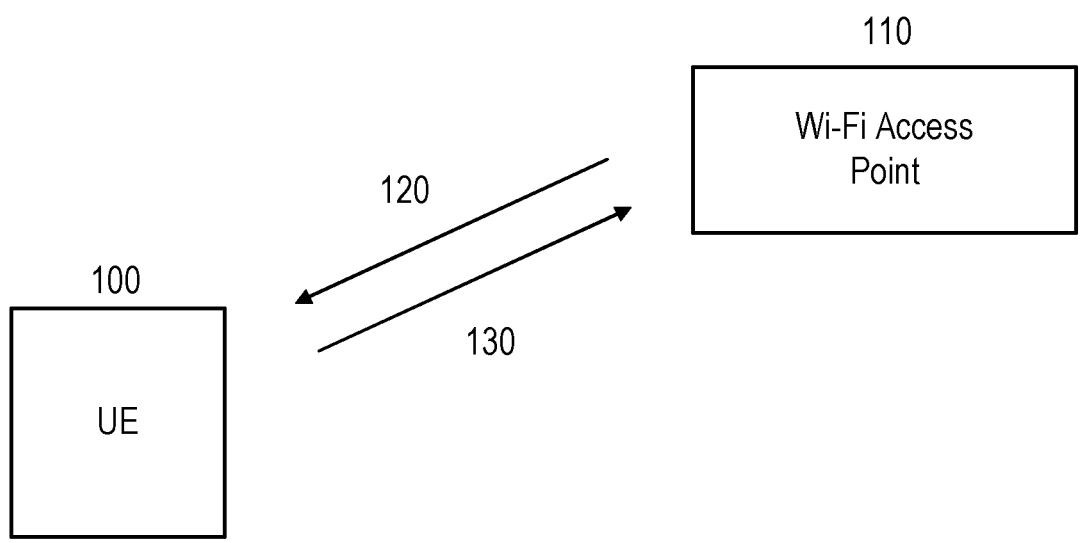
FIG. 1 illustrates a number of nodes in a Wi-Fi™ wireless access network.

In the discussion that follows, specific details of particular embodiments of the present invention are set forth for purposes of explanation and not limitation. It will be appreciated by those skilled in the art that other embodiments may be employed apart from these specific details. Furthermore, in some instances detailed descriptions of well-known methods, nodes, interfaces, circuits, and devices are omitted so as not to obscure the description with unnecessary detail. Those skilled in the art will appreciate that the functions described may be implemented in one or in several nodes. Some or all of the functions described may be implemented using hardware circuitry, such as analog and/or discrete logic gates interconnected to perform a specialized function, application specific integrated circuits (ASICs), programmable logic arrays (PLAs), etc. Likewise, some or all of the functions may be implemented using software programs and data in conjunction with one or more digital microprocessors or general purpose computers. Where nodes that communicate using the air interface are described, it will be appreciated that those nodes also have suitable radio communications circuitry. Moreover, the technology can additionally be considered to be embodied entirely within any form of computer-readable memory, including non-transitory embodiments such as solid-state memory, magnetic disk, or optical disk containing an appropriate set of computer instructions that would cause a processor to carry out the techniques described herein.

Hardware implementations of the present invention may include or encompass, without limitation, digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

In terms of computer implementation, a computer is generally understood to comprise one or more processors or one or more controllers, and the terms computer, processor, and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed. Moreover, the term "processor" or "controller" also refers to other hardware capable of performing such functions and/or executing software, such as the example hardware recited above.

The discussion that follows frequently refers to "UEs", which is the 3GPP term for end user wireless devices. It should be appreciated, however, that the techniques and apparatus described herein are not limited to 3GPP UEs, but are more generally applicable to end user wireless devices (e.g., portable cellular telephones, smartphones, wireless-enabled tablet computers, etc.) that are useable in cellular systems (and that are also referred to as "terminals" herein). It should also be noted that the current disclosure relates to end user wireless devices that support, for example, both a wireless local area network (WLAN) technology, such as one or more of the IEEE 802.11 standards, and one or more wide-area cellular technologies, such as any of the wide-area radio access standards maintained by 3GPP and/or for example more than one radio access technology (RAT), for example two or more wide-area cellular technologies, such as any of the wide-area radio access standards maintained by 3GPP. End user devices are referred to in Wi-Fi document as "stations," or "STA"—it should be appreciated that the term "UE" or "terminal" as used herein should be understood to refer to a STA, and vice-versa, unless the context clearly indicates otherwise.

The disclosure will now be described and references will be made to an Evolved UMTS terrestrial Radio Access Network (E-UTRAN). It should however be noted that this is made for illustrating the disclosure and thus does not exclude implementation of the disclosure with any other mobile communication network, like GSM, WCDMA/UMTS or CDMA.

FIG. 1 illustrates a wireless communication device (UE) (100), able to communicate over the IEEE 802.11 protocols towards a Wi-Fi™ access point, (110). The downlink communication (120) is directed from the Wi-Fi™ access point (110) to the UE (100) and the uplink communication (130) is directed from the UE (100) to the Wi-Fi™ access point (110). The UE may be a mobile phone, a tablet computer, any other user equipment (UE), or any other wireless access device or wireless communication device.

For the UE to find an access point to connect to, a beacon signal is transmitted from the Wi-Fi™ access point. This beacon signal indicates details about the access point and provides the UE with enough information to be able to send a request for access. Accessing a Wi-Fi™ access point includes an information exchange between UE (100) and Wi-Fi™ Access point (110), including, e.g., probe requests and response, authentication requests and response. The exact content of these sequences are omitted for clarity.

At various points in this document it may be mentioned that a UE is "connected" to or is "accessing" a WLAN. It should be appreciated that being connected to or accessing a WLAN can mean any of several different things, as exemplified by the existence of one or more of the below conditions:

802.11 authentication (Authentication to the WLAN AP) has been completed or is under way;

802.1x extensible authentication protocol for subscriber identity module EAP-SIM authentication (Authentication to the authentication, authorisation and accounting (AAA)-servers) has been completed or is underway;

Four way hand-shake between the UE and the WLAN network has been completed;

An IP address has been assigned to the terminal in WLAN;

a packet data network (PDN) connection has been established through the WLAN network, i.e., a connection between the terminal and the PDN gateway;

Data traffic has been started through the WLAN network.

It will be appreciated that when a UE is to access a WLAN, the UE will establish or complete one or more of the above conditions in order to connect to the WLAN.

Figure 2:
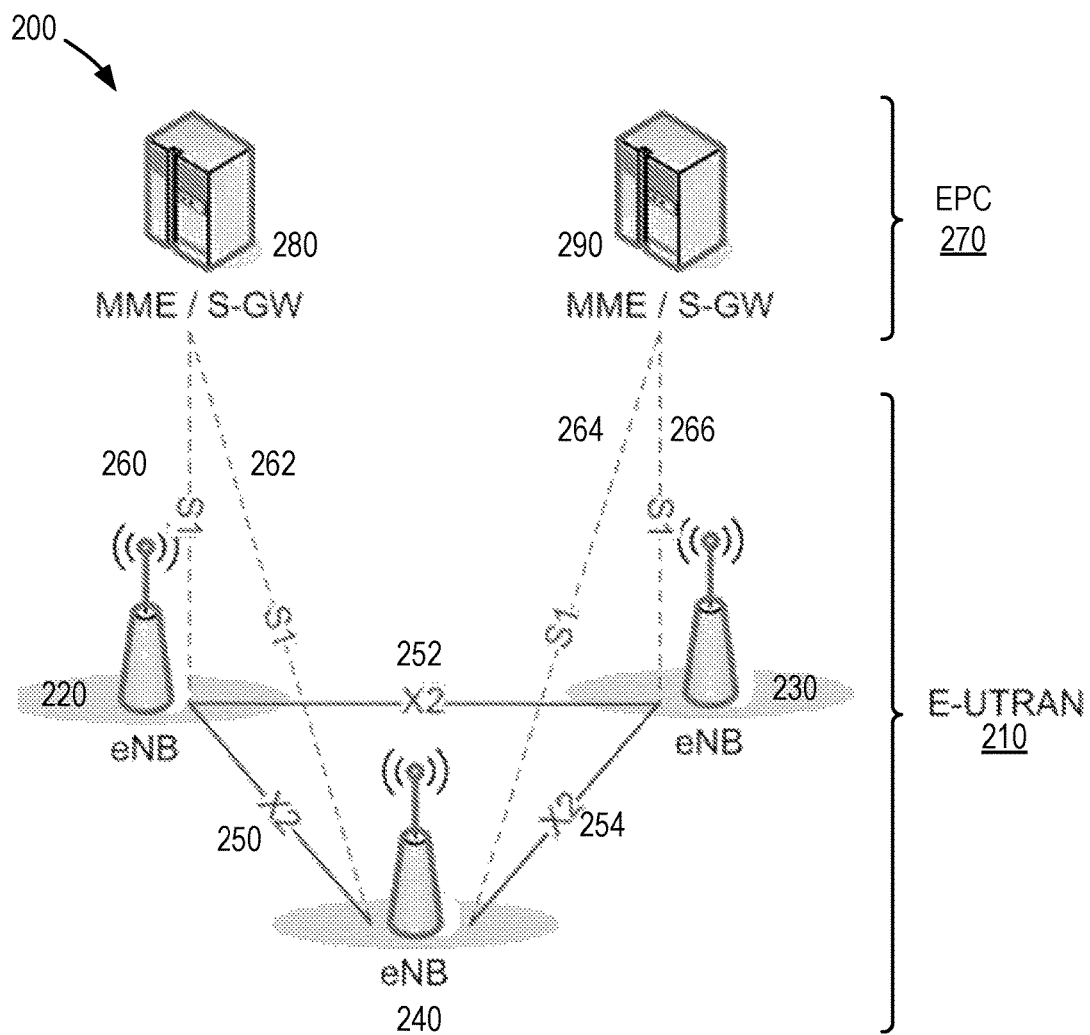
FIG. 2 illustrates an LTE (E-UTRAN) radio access network and a number of core network nodes.

FIG. 2 illustrates a portion of a LTE Radio access network and controller nodes. The LTE network 200 is more formally known as the Evolved UMTS Terrestrial Radio Access Network (E-UTRAN) 210 includes base stations called evolved NodeBs (eNBs or eNodeBs) (220, 230, 240), which provide the E-UTRA (Evolved UMTS Terrestrial Radio Access) user plane and control plane protocol terminations towards a User Equipment (UE). The eNBs are interconnected with each other by means of the X2 interface (250, 252, 254). The eNBs are also connected by means of the S1 interface (260, 262, 264, 266) to the EPC (Evolved Packet Core) 270, more specifically to the MME (Mobility Management Entity) (280, 290) by means of the S1-MME interface and to the Serving Gateway (S-GW) (280, 290) by means of the S1-U interface. The S1 interface supports many-to-many relation between MMEs/S-GWs and eNBs.

The eNB hosts functionalities such as Radio Resource Management (RRM), radio bearer control, admission control, header compression of user plane data towards serving gateway, routing of user plane data towards the serving gateway. The MME 280, 290 is the control node that processes the signalling between the UE and the CN 270. The main functions of the MME 280, 290 are related to connection management and bearer management, which are handled via Non Access Stratum (NAS) protocols. The S-GW 280, 290 is the anchor point for UE mobility, and also includes other functionalities such as temporary downlink (DL) data buffering while the UE is being paged, packet routing and forwarding the right eNB, gathering of information for charging and lawful interception. A Packet Data Network (PDN) Gateway (P-GW), not shown in FIG. 2, is the node responsible for UE Internet Protocol (IP) address allocation, as well as Quality of Service (QoS) enforcement.

Figure 3:
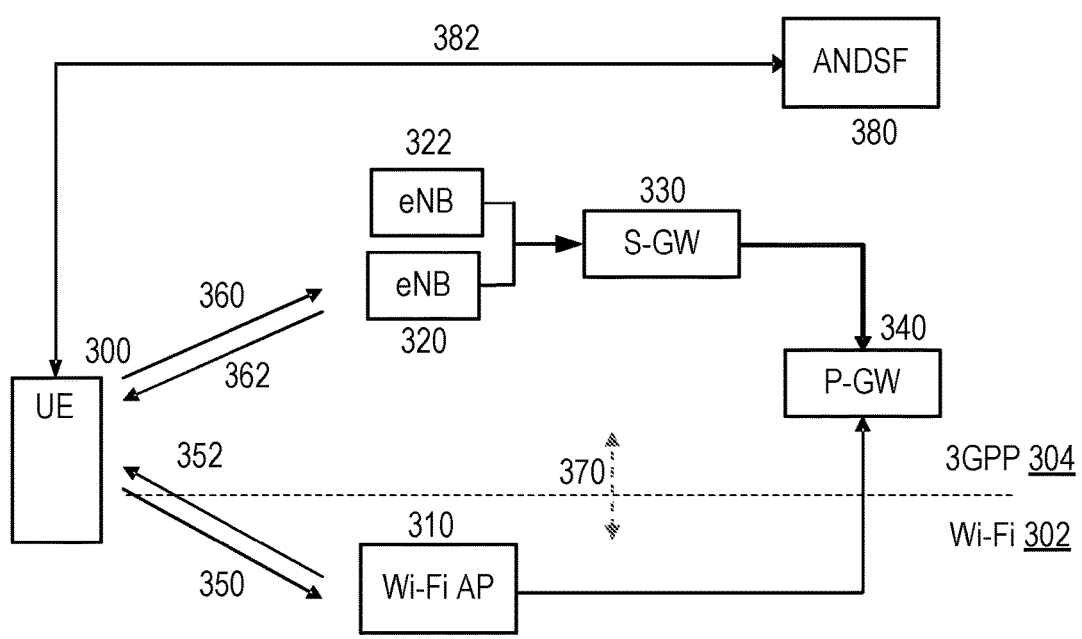
FIG. 3 illustrates a network where both Wi-Fi™ wireless access and LTE (E-UTRAN) radio access is connected to the same packet core network and where an ANDSF server is in communication with a UE.

FIG. 3 illustrates an integration of a Wi-Fi™ radio access network 302 and a LTE radio access network 304 (i.e., a E-UTRAN). The integration includes the E-UTRAN radio access parts (e.g. eNBs 320, 322) and the Wi-Fi™ wireless access point (310), which are both connected to the same P-GW (340). In the case of the LTE radio access network 304, the eNBs 320, 322 are connected to the P-GW 340 via an S-GW 330. A UE (300) in this illustration is capable of being served both from the Wi-Fi™ Access Point (310) and the LTE eNBs (320, 322). Arrows 350 and 352 illustrate the uplink (UL) and downlink (DL) transmissions between the UE 300 and the Wi-Fi AP 310 respectively and arrows 360 and 362 illustrate the uplink (UL) and downlink (DL) transmissions between the UE 300 and the eNBs respectively. FIG. 3 illustrates one possible way of connecting a Wi-Fi™ access network 302 to the same core network of the 3GPP specified access network 304. It should be noted that the disclosure is not restricted to scenarios when the Wi-Fi access network 302 is connected in this way, scenarios where the networks are more separate, e.g., like illustrated in FIGS. 1 and 2 are also possible scenarios.

In an embodiment, there can be an interface (370) between the Wi-Fi™ and 3GPP domains, whereby the two networks can exchange information that can be used to facilitate steering traffic to the right network. One example of such information exchanged via the interface (370) is load conditions in the two networks. The two networks can also exchange information with regard to the context of the UE (300), so that they can each be aware if the UE is being served by the other network, as well as some details of the connection over the other network (e.g. traffic volume, throughput, etc.).

The Wi-Fi™ domain may have an access point controller (AC) that controls the Wi-Fi™ AP 310, and this functionality can be physically located in 310, 340 or another separate physical entity.

An Access Network Discovery and Selection Function (ANDSF) server 380 is also provided in the system. In the Access Network Discovery and Selection Function (ANDSF) server 380, a policy or policies for access selection resides therein, and these are communicated via interface 382 to the UE 300.

The ANDSF server 380 is an entity that is defined by 3GPP for providing access discovery information as well as mobility and routing policies to the UE. ANDSF is an entity added to the 3GPP architecture in 3GPP TS 23.402 (See "Architecture Enhancements for non-3GPP Accesses," 3GPP TS 23.402, available at the 3gpp website). As shown in FIG. 3, the ANDSF server is only connected to the UE, and its main goal is to provide the UE with access network information in a resource efficient and secure manner. By supplying information about both available 3GPP and non-3GPP access networks to the UE, the ANDSF enables an energy-efficient mechanism of network discovery, where the UE can avoid continuous and energy-consuming background scanning. Furthermore, the ANDSF provides the mobile operators with a tool for the implementation of UE steering of access mechanisms, where policy control can guide UEs to select one particular RAN over another.

ANDSF supplies three types of information—discovery information, inter-system mobility policy (ISMP) information, and inter-system routing policy (ISRP) information. All these are summarized and implemented via ANDSF managed objects (MO), which are communicated to the UE.

The discovery information provides the UE with information regarding the availability of different RAN's or different RATs in the UE's vicinity. This helps the UE to discover available 3GPP and non-3GPP access networks without the burden of continuous background scanning. Inter-System Mobility Policies (ISMP) are policies which guide the UE to select the most preferable 3GPP or non-3GPP access. The ISMP are used for UEs that access a single access network (e.g., 3GPP or Wi-Fi™) at a time. The ISMP information specifies the behaviour of UEs that can be connected to only one access network at a given time (either 3GPP, WLAN, WiMAX, etc). If the UE, however, supports connection to several access networks at the same time, the operator can use the third type of information, ISRP, to increase the granularity of the RAN selection. In that case, the UEs will be provided with policies that specify how different traffic flows should be distributed over the different RAN. For example, voice might be only allowed to be carried over 3GPP radio access networks, while Internet video streaming and best-effort traffic can be routed via WLAN networks.

With the proliferation of devices that have both Wi-Fi and 3GPP mobile broadband support, offloading traffic to the Wi-Fi™ network is becoming very interesting, both from the user's and the operator's perspectives. The main difference between traffic steering in the Wi-Fi™ case as compared to steering between 3GPP networks (or 3GPP-"friendly" networks such as CDMA2000) is that, in the former case, it is the terminal that decides whether it shall select a Wi-Fi™ Access Point (AP), while in the latter case it is the network that is in charge of the network access decisions. Due to technical and historical reasons, the Wi-Fi™ deployment scenario is in many cases fundamentally different than the cellular deployment. For this reason, special considerations have to be made when integrating Wi-Fi™ to 3GPP networks.

Figure 4:
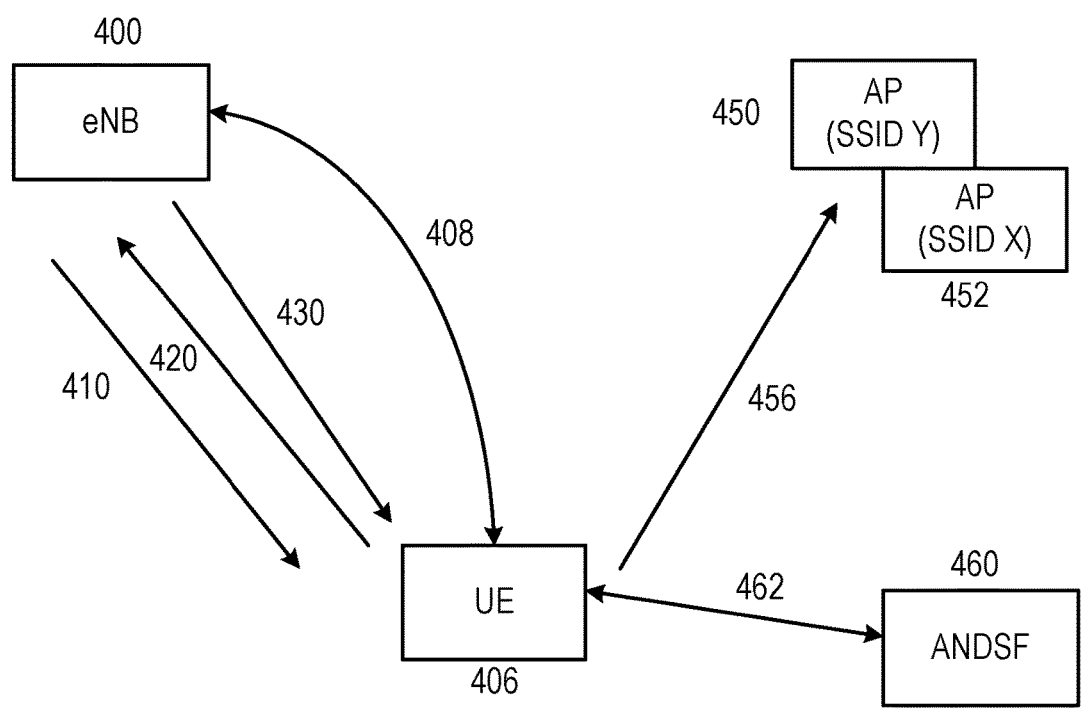
FIG. 4 illustrates network portions and a UE according to one embodiment of the present disclosure.

FIG. 4 illustrates one possible approach for a RAN controlled access selection according to one embodiment of the present disclosure. In the illustrated environment, an eNB RAN node (400) in a 3GPP RAN communicates a first message (410) to a UE (406) (or to any other UE or terminal) with instruction on how the UE should support a network controlled access selection. Even though there may be more nodes, the eNB RAN node (400) will in this description represent a complete RAN. The UE may be in either connected mode with the eNB, with traffic exchange (408), or it may be in idle mode with no traffic. The message 410 may, for example, include instructions on when a UE should start to measure surrounding Wi-Fi™ networks, e.g., when certain criterion or criteria are fulfilled. The criteria could include for example signal quality or signal strength of the eNB (400) as measured at the UE, or signal strength of the Wi-Fi™ AP with service set identification (SSID) Y (450) or Wi-Fi™ AP with SSID X (452) as measured at the UE, where AP's may be associated with different service providers or Wi-Fi™ operators or different SSID's.

One possible set of criteria from message 410 could include conditions for Wi-Fi™ (450, 452):
Received signal strength of a Wi-Fi network has to be larger than threshold Th1 Received signal quality of a Wi-Fi network has to be larger than threshold Th2 Wi-Fi™ load (if broadcast from AP's) of network 450 or 452 has to be less than threshold Th3.

One possible set of criteria could include conditions for 3GPP access networks, such as the 3GPP RAN (400) serving UE 406 or of another RAN:
Received signal strength of the 3GPP RAN network has to be larger than threshold Th4.
Received signal quality of the 3GPP RAN network has to be larger than threshold Th5.

The conditions for the currently serving RAN (400) could also be considered in that message 410 is not sent to the UE unless certain criteria for signal quality or strength are fulfilled.

In some situations, the signal 410 may also be broadcast from the RAN node (400). This may be feasible if there is no need to differentiate criteria for specific UE's. Then UE's that do not have active signalling connections to RAN (400) will also get the criteria and it will be possible to also steer idle UE's to different access networks, such that future communication between an access network and the UE will start in a RAN controlled access.

In an embodiment, once the criteria signalled in message 410 are fulfilled in the UE (406), it will conduct prespecified actions indicated in the message 410, such as a message to measure and report for an AP with SSID X (450) and an AP with SSID Y (452). If UE 406 finds access points (AP) with these SSIDs, it may measure and even engage in communication, over channel 456, with these AP's to find out, e.g., performance metrics through Access Network Query Protocols (ANQPs) or similar. Alternatively, the UE (406) may simply scan for any AP and report the strongest one(s) to the RAN.

According to one embodiment of the present disclosure, the UE 406 also performs procedures for identifying an access selection according to an ANDSF policy or policies that the UE has received from an ANDSF server (460) over interface 462. The UE evaluates the policies and identifies a particular RAN (this identified RAN is referred to as the "Policy selected RAN"). The result of such evaluation may, for example, indicate the preference of the ANDSF policy for UE 406 to stay with the current RAN (400) serving the UE or for UE 406 to move communications to an AP with SSID Y or to an AP with SSID X or to another RAN.

Since the solution should be a RAN-controlled solution, the UE shall not act on the result of the policy evaluation. Instead, the UE shall include an indication of the result of the ANDSF policy evaluation in a response message to the controlling RAN (e.g., the RAN that is currently serving the UE, which in this example is RAN 400). The response message may be part of an evaluation report 420 that is sent to the RAN 400 for further consideration in the network. Thus, the report from the UE sent in message 420, once the criteria signalled in message 410 are fulfilled, may include the following information:

Signal strength and/or quality of AP SSID Y
Signal Strength and/or quality of AP SSID X
Load of AP SSID X
Policy selected RAN In an embodiment, the reporting of the Policy selected RAN to the controlling RAN is in a format that can be interpreted through RAN protocols and mechanisms. Thus, the UE need not send any ANDSF policies to the RAN, but can simply send the result of the policy evaluation made in the UE if the available ANDSF policy or policies were applied. This way, the UE is made to indirectly forward information about ANDSF policies to the controlling RAN without the need for the controlling RAN to engage in or trying to interpret and translate policies that relates to, e.g., services, subscriptions or other domains that the controlling RAN does not have any detailed knowledge about. This is seen as an advantage of the disclosure since the controlling RAN does not need to care about which higher level policy or policies has decided the preferred access, meaning that these higher level solutions can continue to evolve without impacting the controlling RAN.

In the RAN node (400) (i.e., the controlling RAN), evaluation of both the radio related information sent from the UE, along with information already available in the RAN 400 (e.g., load conditions in the RAN), takes place. A selection algorithm in the RAN 400 (either in eNB or any other RAN controller node) may decide on access network selection based on both the radio related information as well as the ANDSF policy evaluation result. In some situations, such as when the load is low RAN 400, it may make very little difference if the selection of access network is purely based on radio conditions, or if other considerations are also taken into account. In these situations, the RAN 400 may elect to follow the ANDSF policy evaluation result communicated from the UE even if it is not the same as what would have been selected if only RAN conditions were considered.

The result of the evaluation is sent to the UE (406) in an access selection execution command (430), which indicates a RAN 400 selected AP (e.g., the AP with SSID Y). The UE, in response, attaches to (e.g., associates with) the indicated AP.

Advantages

Advantages provided by this disclosure include the ability of a controlling RAN to exert control over the access points that UE will utilize to gain network access. In controlling the selection, the controlling RAN may take into account dynamic information that the controlling RAN has about signal quality or load of that RAN or of another RAN. The controlling RAN may further rely on a result of a network selection policy evaluation that the UE has performed. The policy may reflect a network selection preference that the RAN does not know about, is not part of the RAN's functionality, or does not have the ability to interpret. The RAN-controlled network selection of this disclosure thus provides greater network control of network selection while also taking into account network selection policies that may not be practical for the RAN to directly evaluate.

Exemplary Methods

Figure 5:
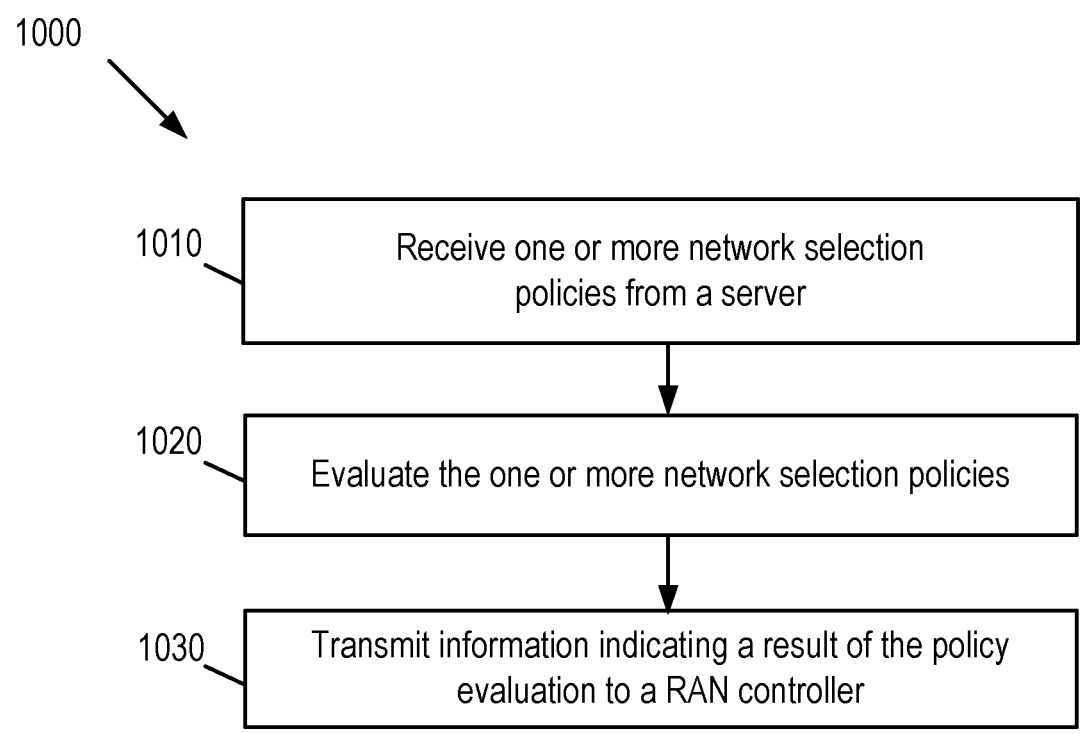
FIGS. 5-10 illustrate flow diagrams according to embodiments of the present disclosure.

FIG. 5 is a flow diagram illustrating a process 1000 performed by UE 100 to, for example, facilitate a selection among a set of two or more radio access networks (RANs).

In an embodiment, the process 1000 begins at step 1010, where UE 406 receives a network selection policy from a server, such as one or more Access Network Discovery and Service Function (ANDSF) policies from an ANDSF server. In an embodiment, the policy may identify a selection priority among a set of two or more RANs. The set of RANs may include two or more of a 3GPP cellular RAN (e.g., an access network provided through a NB or eNB), another type of cellular RAN (e.g. a non-3GPP cellular RAN), an IEEE 802.11-based RAN (e.g., an access network provided through an IEEE 802.11-compliant access point (AP)), an IEEE 802.16-based RAN (e.g. WiMAX), or any other RAN. It will be appreciated that the set of RANs may also include multiple instances of a particular type of RAN. For example, the set of RANs may include multiple 802.11 RANs with different SSIDs.

In step 1020, UE 406 evaluates the network selection policy to identify a particular RAN (the identified RAN is referred to herein as the "policy selected RAN"). It will be appreciated that there may be a (or different) policy selected RAN(s) for certain types of traffic or bearer realisations of traffic.

In step 1030, UE 406 transmits information indicating a result of the policy evaluation to a controlling RAN (e.g., the RAN that is currently serving UE 406); more specifically the UE transmits the information to a RAN controller within the controlling RAN, such as an eNB of the controlling RAN. The information may identify, in an embodiment, the policy selected RAN. In a LTE or UMTS system, the controller of the controlling RAN may be, for instance, located in the eNB (e.g., eNB 320 or eNB 322) or NB, respectively.

Figure 6:
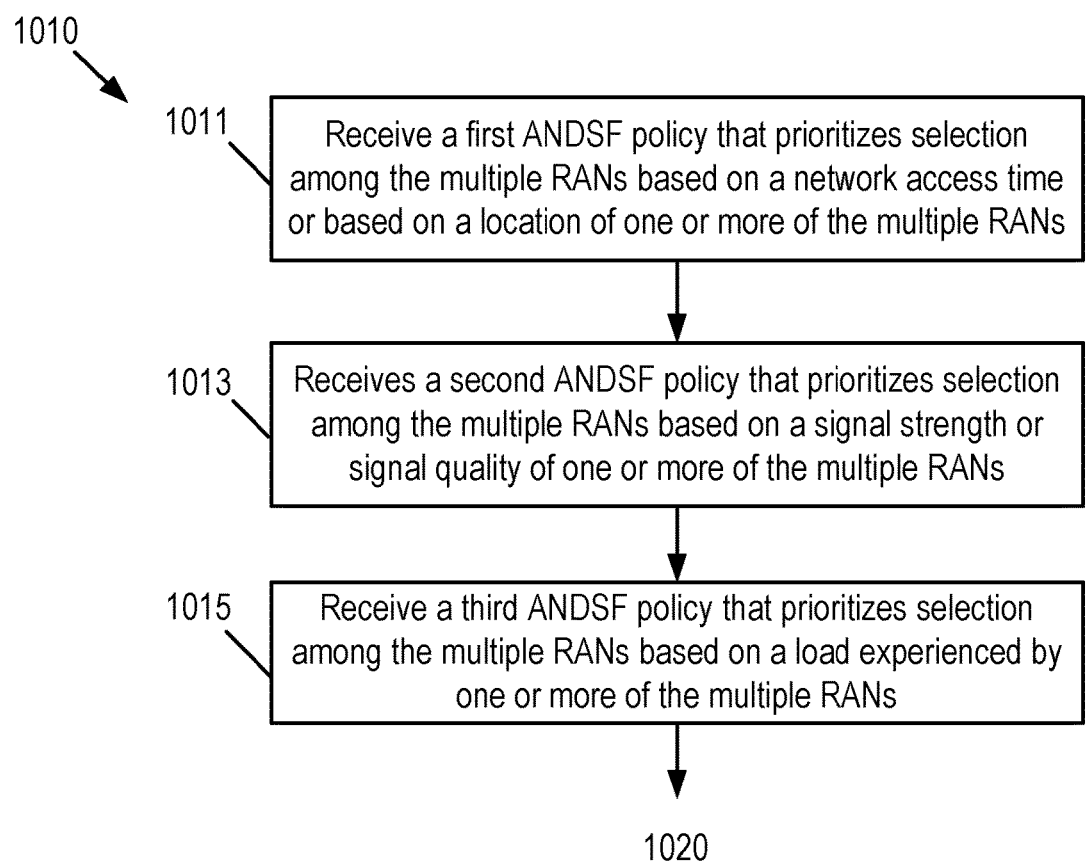

FIG. 6 is a flow diagram that illustrates step 1010 in one embodiment. As shown, step 1010 may include a step 1011, where UE 406 receives a first ANDSF policy that prioritizes selection among the set of RANs based on a network access time (i.e. a time of access) or based on a location of one or more of the set of RANs. The policy may indicate, for instance, that a particular RAN or particular type of RAN is preferred during a certain network access time (e.g., a peak access time), or that a particular RAN or type of RAN is preferred at the UE's current location.

Step 1010 may also include a step 1013, where UE 406 receives a second ANDSF policy that prioritizes selection among the set of RANs based on a signal strength or signal quality of one or more of the set of RANs. In some cases, the second policy may include one or more thresholds for evaluating the signal strength or signal quality of the one or more RANs.

Step 1010 may also include a step 1015, UE 406 receives a third ANDSF policy that prioritizes selection among the set of RANs based on a load experienced by one or more of the set of RANs. In an embodiment, the third policy may include one or more thresholds for evaluating the load experienced by the one or more RANs. In other embodiments, a different set of ANDSF policies may be received by UE 406.

As illustrated in FIG. 6, the three received ANDSF policies may be used to make the ANDSF policy evaluation at step 1020. It will be appreciated that the three policies are typically received as part of a managed object (MO) and are not received one by one. Where multiple policies are received, the policy evaluation relies on all of the received policies.

Information about the result of the ANDSF policy evaluation is transmitted to a RAN controller so that the RAN controller may decide whether to defer to the ANDSF policy evaluation or to override the ANDSF policy.

Figure 7:
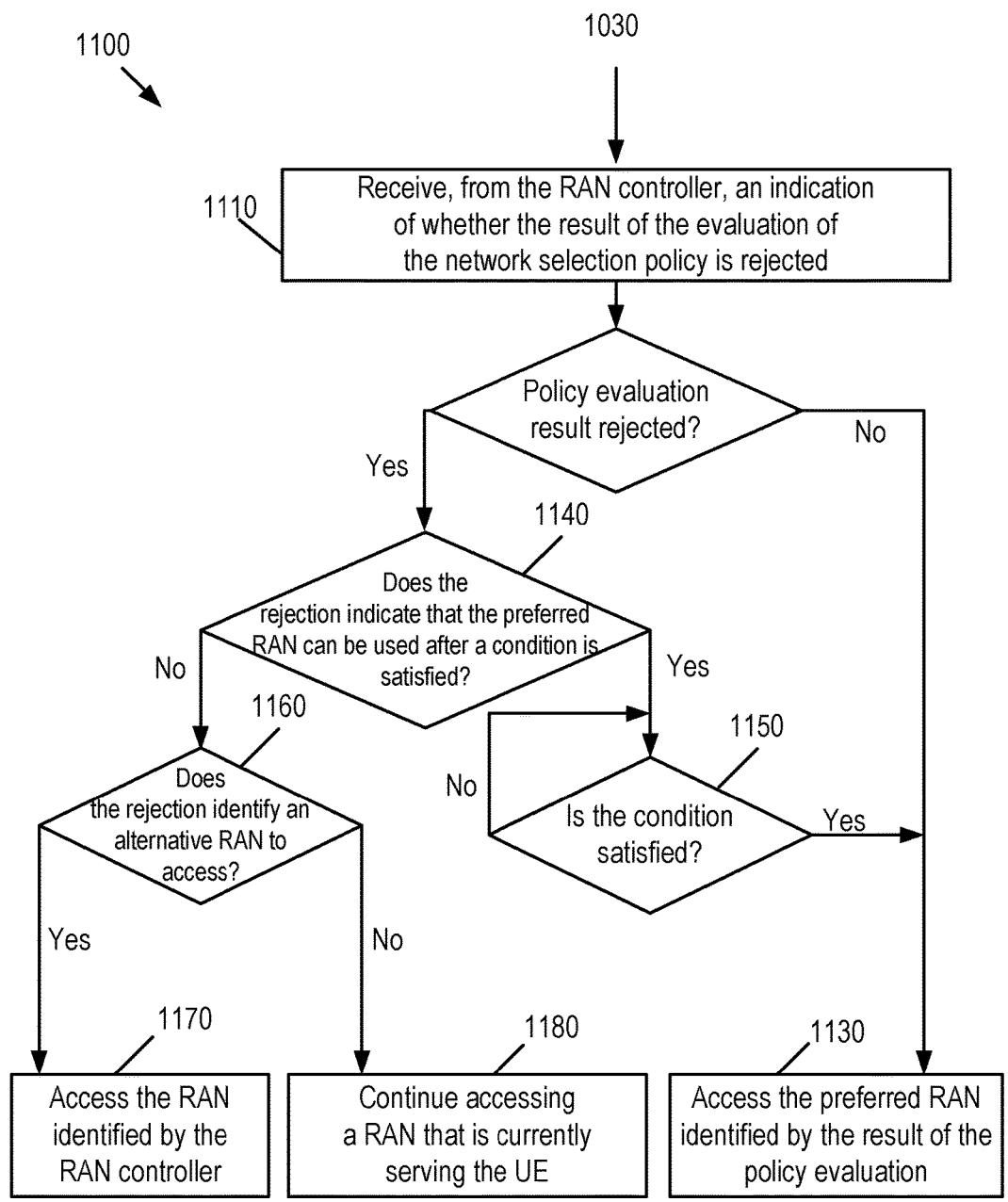

FIG. 7 is a flow diagram illustrating an example process 1100 in which UE 406 receives information from the RAN controller concerning a RAN selection. UE 406 receives the information in response to transmitting, at step 1030, the information indicating the result of the ANDSF policy evaluation to the RAN controller. In an embodiment, the process 1100 begins at step 1110, where the UE 406 receives, from the RAN controller, an indication of whether the result of the evaluation of the ANDSF policy is rejected.

The process proceeds to step 1130 if the policy evaluation result is not rejected, and proceeds to steps 1140-1180 if the policy evaluation is rejected. In an embodiment, UE 406 may receive an express indication from the RAN controller that the policy evaluation is not rejected, while in another embodiment UE 406 may assume that the policy evaluation is not rejected if it does not receive an indication of rejection from the RAN controller during a threshold duration.

In step 1130, in response to determining that the RAN controller has not rejected the result of the ANDSF policy evaluation, UE 406 accesses the policy selected RAN. In some cases the UE 406 accesses the policy selected RAN for all types of UE traffic, and in other cases the UE 100 moves certain type(s) of traffic or bearer realisations of traffic indicated in the result of the ANDSF policy evaluation to the selected RAN.

In an embodiment, if the RAN controller rejects a result of an evaluation of an ANDSF policy, it may do so conditionally. For example, in step 1140, in response to determining that the RAN controller has rejected the result of the ANDSF policy evaluation, UE 406 further determines whether the rejection includes an indication that the policy selected RAN can be used after one or more conditions are satisfied. That is, the RAN controller may reject the policy selected RAN by instructing UE 406 to temporarily access an alternative RAN and to thus delay access of the policy selected RAN until a condition is fulfilled. The one or more conditions may include, for instance, a signal quality of the policy selected RAN improving beyond a threshold, or a signal quality of the alternative RAN deteriorating below another threshold.

In step 1150, in response to determining that the policy selected RAN can be used after the one or more conditions are satisfied, UE 406 tracks whether the condition(s) are satisfied. Once the condition(s) are satisfied, UE 406 may access the policy selected RAN at step 1130.

In step 1160, in response to determining that the RAN controller has not indicated whether the policy selected RAN can be used after one or more condition(s) are satisfied, UE 406 determines whether the rejection identifies an alternative RAN to access. For instance, if the result of the ANDSF policy evaluation identifies a particular IEEE 802.11 network as a preferred RAN, the alternative RAN may be another IEEE 802.11 network, a 3GPP RAN controlled by the RAN controller, a neighbouring 3GPP RAN, or any other RAN.

In step 1170, in response to determining that the rejection identifies an alternative RAN to access, UE 406 accesses the alternative RAN (or moves the certain types of traffic or bearer realisations of traffic to the alternative RAN, as appropriate).

In step 1180, in response to determining that the rejection does not identify an alternative RAN to access, UE 100 may continue to access a RAN that is currently serving the UE. Step 1180 may apply, for example, when the result of the ANDSF policy evaluation indicates a preference for changing what network will serve UE 406. If that change is rejected by the RAN, UE 406 may continue using a RAN (e.g., a 3GPP LTE RAN) that is currently serving UE 406. The UE may continue using the RAN for a predefined duration or indefinitely.

To facilitate the RAN controller's ability to accept or reject the result of the ANDSF policy evaluation, UE 406 may obtain information that is requested by the RAN controller.

Figure 8:
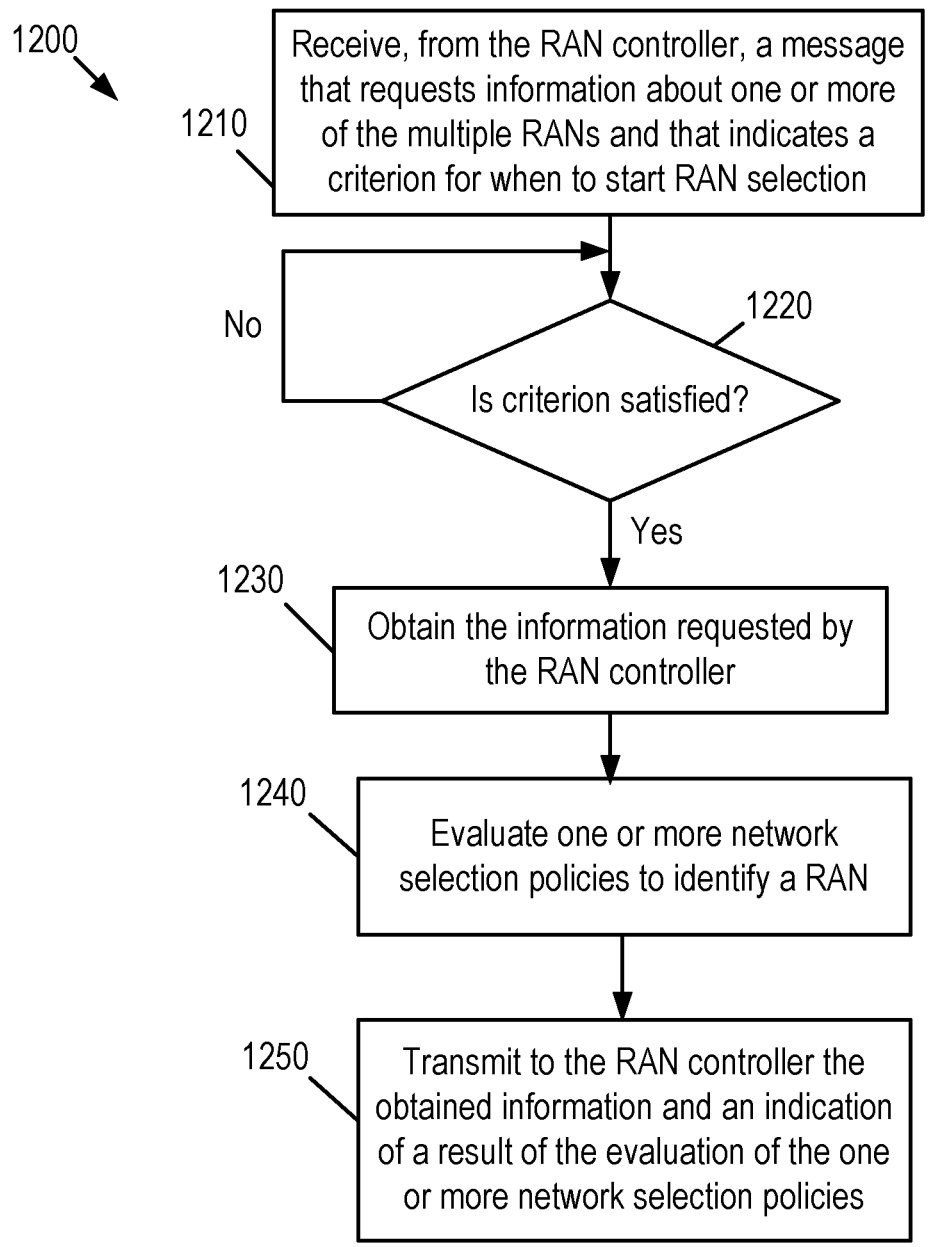

FIG. 8 is a flow diagram illustrating a process 1200 for obtaining and returning RAN-controller-requested information. In an embodiment, the process 1200 begins at step 1210, where UE 406 receives, from the RAN controller, a message that requests information about one or more of the set of RANs and that indicates a criterion on when to start RAN selection (i.e. when to perform the evaluation of the network selection policy).

In an embodiment, the requested information may relate to a signal strength, signal quality, or load of one or more of the set of RANs. The information may include, for instance, a measurement value of the signal strength, signal quality, or load, or may simply include an evaluation of whether the signal strength, signal quality, or load is above a threshold.

In an embodiment, the criterion may indicate that evaluation of network access selection should not be started until a certain time or until a property of one or more of the set of RANs reaches a threshold. For example, the criterion may instruct UE 406 to perform steps related to RAN selection only if a signal strength or signal quality of a RAN currently serving UE 406 has fallen below a threshold, or if signal strength or signal quality of another RAN has risen beyond another threshold.

In step 1220, UE 406 determines whether the criterion for beginning RAN selection has been satisfied. UE 406 may choose to not proceed to steps 1230-1250 until the criterion is satisfied.

In step 1230, in response to determining that the criterion is satisfied, UE 406 may obtain the information requested by the RAN controller. UE 406 may, for example, perform a measurement of one or more parameters (e.g., signal strength, signal quality, or load) of one or more of the set of RAN's (e.g., of a cellular RAN currently serving UE 406, of a neighbouring cellular RAN, or of a IEEE 802.11 or 802.16 RAN detected by UE 406). If the RAN controller requested an evaluation of whether the one or more parameters satisfy a threshold, UE 406 may perform the evaluation. In that instance, step 1230 may overlap with step 1220, which may also evaluate a RAN parameter against a threshold.

In step 1240, UE 406 evaluates one or more network selection policies to identify a RAN. Step 1240 may be similar to step 1020. In process 1200, the step is not performed until the criterion on when to start RAN selection has been satisfied.

In step 1250, UE 406 transmits to the RAN controller the obtained information and an indication of a result of the evaluation of the one or more network selection policies (e.g., the identity of the RAN identified in step 1240). As stated above, the obtained information may include an evaluation of one or more RAN parameters against one or more thresholds, or may include the parameter values themselves.

Figure 9:
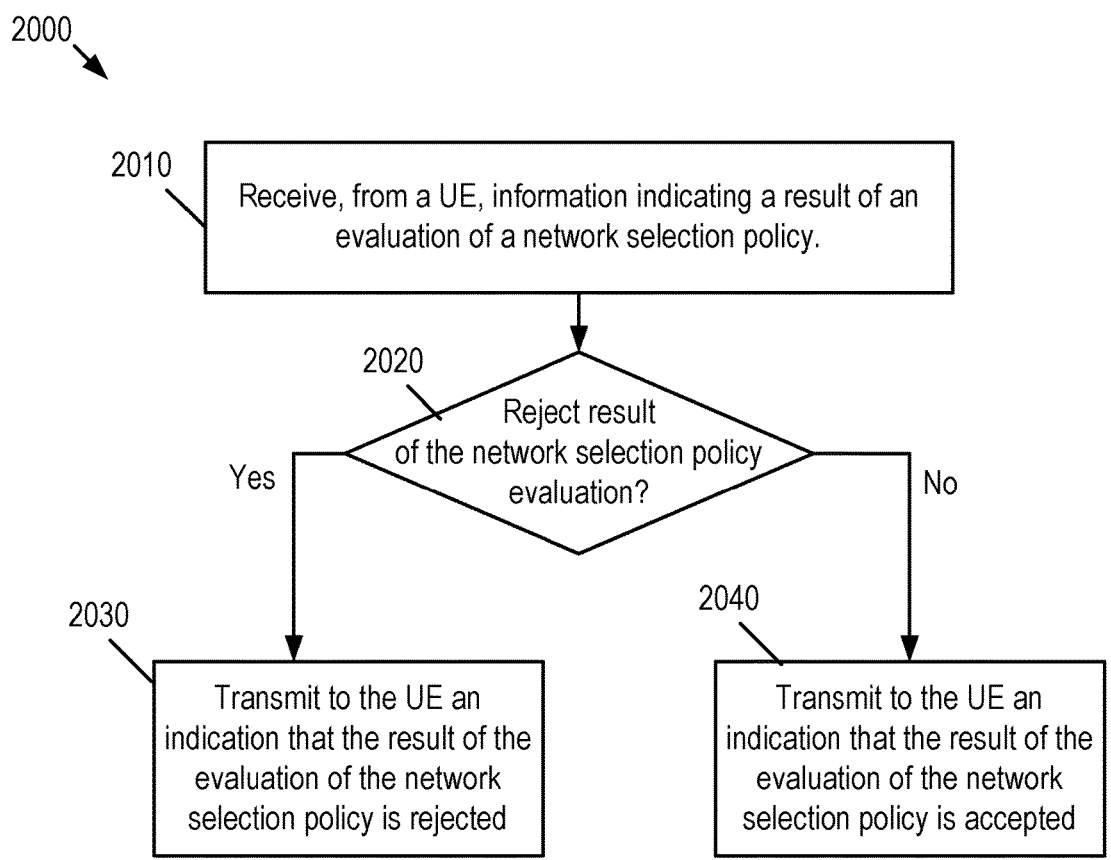

FIG. 9 is a flow diagram illustrating a process 2000 performed by a RAN controller of a controlling RAN performing RAN selection. In an embodiment, process 2000 may be a counterpart to process 1000. The former process illustrates RAN selection from the UE's perspective, while the latter process illustrates RAN selection from the RAN controller's (e.g. eNB or NB) perspective.

In an embodiment, process 2000 begins at step 2010, where the RAN controller receives, from UE 406, information indicating a result of an evaluation of a network selection policy. In an embodiment, the information includes the identity of a RAN identified by the UE as a result of the UE's evaluation of the network selection policy (as mentioned above, the identified RAN is referred to as the "policy selected RAN"). The network selection policy may be, for example, an ANDSF policy.

In step 2020, the RAN controller decides whether to reject the result of the evaluation of the network selection policy. In an embodiment, the decision may be based on dynamic information, such as a current load of the policy selected RAN or, more generally, an estimated performance increase from accessing the RAN. In that example, if the policy selected RAN is too congested, or more generally would not offer more than a threshold level of estimated performance, the RAN controller may reject the result of the network selection policy evaluation.

In an embodiment, if the RAN controller decides not to reject the result of the evaluation of the network selection policy, it may transmit an indication to UE 406 that the result is accepted (step 2040). In another embodiment, if the RAN controller decides not to reject the result of the evaluation of the network selection policy, it may simply withhold a response. In that embodiment, if UE 406 receives no response (i.e., no rejection) for a threshold duration, it may assume that the result is accepted.

In step 2030, in response to a decision to reject the result of the evaluation of the network selection policy, the RAN controller transmits an indication of the rejection to UE 406. In an embodiment, the rejection may indicate that access of the policy selected RAN needs to be delayed until a condition is satisfied. After the condition is satisfied, accessing the policy selected RAN may be acceptable to the RAN controller. The condition may, for example, include a signal quality or load of the policy selected RAN improving beyond a certain threshold, or include a signal quality or load of a RAN that currently serves UE 100 deteriorating below another threshold. In an embodiment, the rejection may identify an alternative RAN for UE 406 to access.

As stated above, the RAN controller's determination of whether the result of the policy evaluation is rejected or not may depend on a load of the identified preferred RAN versus a load of another RAN of the set of RANs. The determination may more generally be based on a comparison of an estimated performance that UE 406 would experience from accessing the policy selected RAN versus an estimated performance that UE 406 would experience from accessing another of the set of RANs.

Figure 10:
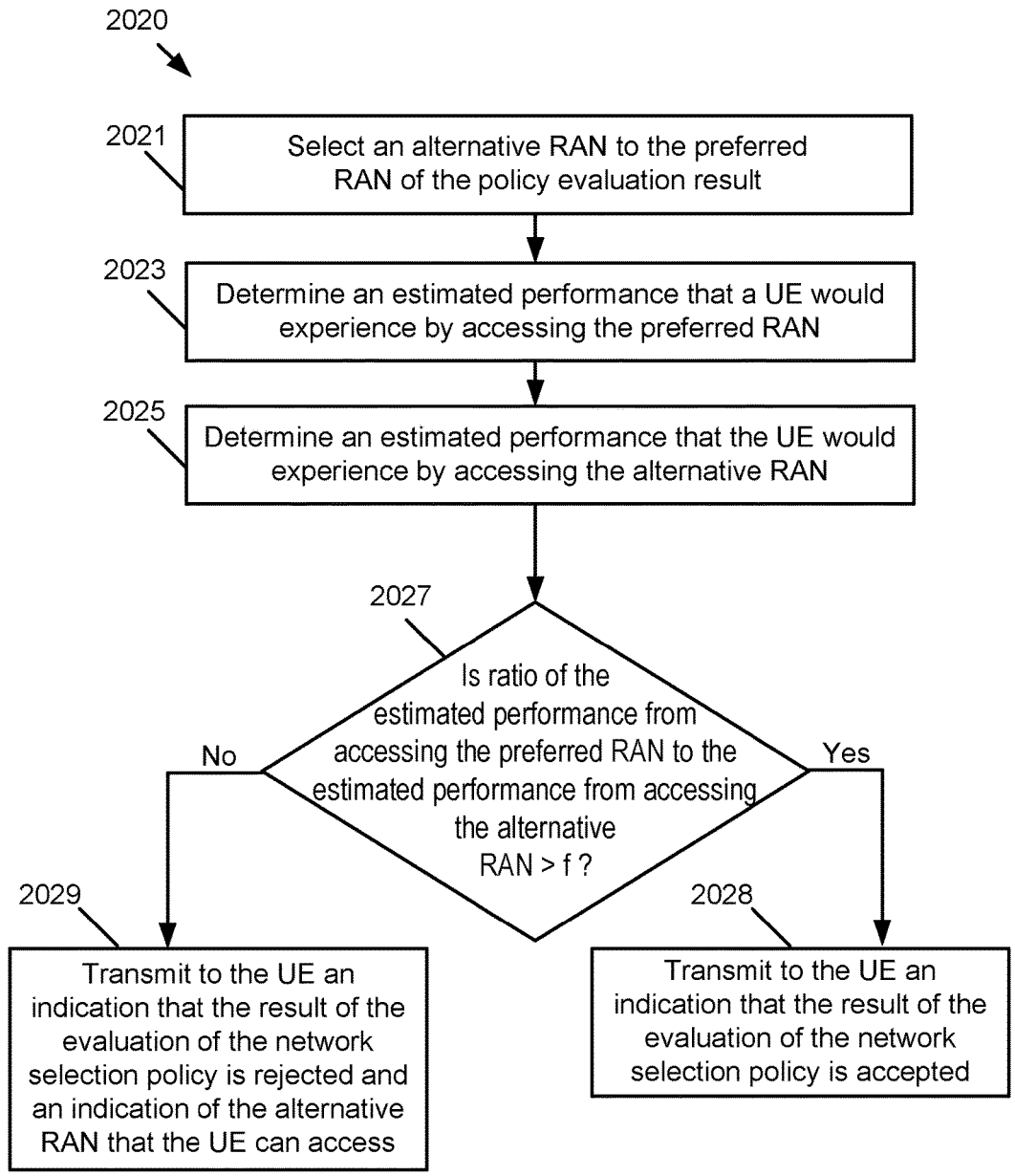

FIG. 10 illustrates an example of how the RAN controller determines at, step 2020, whether to reject the result of the evaluation of the ANDSF policy.

In an embodiment, the decision process begins at step 2021, where the RAN controller selects an alternative RAN to the policy selected RAN. In a case where UE 406 has access to only two RANs (e.g., a 3GPP cellular RAN controlled by the RAN controller and an IEEE 802.11 RAN), the alternative RAN may simply be the RAN that is not the policy selected RAN. In a case where UE 406 has access to more RANs, the RAN controller may select the alternative RAN based on information from UE 406 (such as measurements of IEEE 802.11 APs and 3GPP RANs) and based on information that is available to the RAN controller (such as load conditions in the serving and surrounding cells, or load in other 3GPP cells of different access technologies, etc.).

In step 2023, the RAN controller determines an estimated performance that UE 406 would experience by accessing the policy selected RAN. The estimated performance may estimate an average access latency, a throughput, or any other performance metric.

In step 2025, the RAN controller determines an estimated performance that UE 406 would experience by accessing the alternative RAN.

In step 2027, the RAN controller determines whether a ratio of the estimated performance from accessing the policy selected RAN to the estimated performance from accessing the alternative RAN is greater than a factor (threshold) f. The factor f may be, for example, a value specified by a network operator, and may take a value in the range 0.8-0.9. The decision proceeds to step 2028 if the ratio is greater than f, and proceeds to step 2029 if the ratio is not greater than f.

In step 2028, in response to a determination that the ratio is greater than f, the RAN controller transmits to UE 406 an indication that the result of the evaluation of the ANDSF policy is accepted. Thus, the RAN controller may decide to defer to the ANDSF policy evaluation if the estimated performance from accessing the policy selected RAN, when compared to the estimated performance from accessing the alternative RAN, is greater than the threshold f. As discussed above, other embodiments of the decision process may omit this step. In such embodiments, UE 406 may treat silence from the RAN controller as an acceptance.

In step 2029, in response to determining that the ratio is not greater than f, the RAN controller transmits to UE 406 an indication that the result of the evaluation of the network selection policy is rejected and an indication of the alternative RAN that UE 406 can access. Thus, if the estimated performance from accessing the ANDSF policy's selected network, when compared to the estimated performance from accessing the alternative network, is not greater than a certain threshold, the RAN controller overrides the result of the ANDSF policy evaluation with an alternative RAN selected by the controller.

According to one embodiment of the present disclosure, the network-controlled network selection achieves a goal of having a predictable RAN selection mechanism. Further, the network-controlled RAN selection takes into account radio-related information that is dynamic in nature and also takes into account preferences (e.g., service-based preferences) related to a potential ANDSF function without the need to forward any details of ANDSF policies to the RAN. The RAN only interacts with the ANDSF policies indirectly by receiving an indication of a result of an evaluation of the ANDSF policies. The evaluation may be performed by a UE.

In an embodiment of the present disclosure, the trigger for the UE to make an evaluation is not governed through criteria fulfilment signalled from the controlling RAN, such as the criterion-governed RAN selection in process 1200. Instead the trigger to send an evaluation report (420) to the controlling RAN may be triggered by the UE itself, when it evaluates one or more ANDSF policies in the UE.

In an embodiment, the UE 406 may receive ANDSF policies that relate to radio-related performance measures.

According to an aspect of the disclosure, the ANDSF function is capable of indicating specific flows and preference to use specific accesses for specific communication to and from the UE and other accesses (simultaneously) for other communication to and from the UE. As described above, inter-system routing policies (ISRP) may specify that, e.g., web browsing should go over one access network while simultaneously voice should go over another access network.

According to one embodiment of the present disclosure, evaluation of ANDSF policies can take ISRP into account.

If, in a certain situation, ANDSF policies are indicating that internet browsing should never go over a 3GPP access network, this could also be indicated to the RAN, such that the RAN will not even try to select another RAN for certain flows. It is worth noting that with such steering, it is important that the UE translates the ANDSF policies and restrictions (such as policies and restrictions on services), to parameters that the RAN can understand. Usually, flows or PDN connections, which are used to identify traffic in ANDSF, are not recognized in RAN. Rather in RAN, bearers are known. One PDN connection can be realized using more than one bearer. Thus, the UE should make a translation of flows to bearer definition parameters instead, such that RAN can understand and take into consideration in the access selection algorithm. In such occasions, the RAN algorithm could ignore evaluation based on radio performance if there is an indication sent from a UE that a certain type of bearer should, e.g., never be sent on Wi-Fi. Then the ANDSF indications sent from the UE to the radio access network could always be followed. The selection in RAN may then instead be about selecting the best non-Wi-Fi access.

According to yet another embodiment of the disclosure, a UE may have additional mechanisms for automatically selecting or prioritizing different accesses, e.g., UE specific or operating system (OS) specific connection managers. For example, such a UE algorithm could be used to estimate the throughput that the UE is expected to get from the different access links and priority could be assigned to each one based on that. Evaluations of access links according to such functionality may also be forwarded to the radio access network in conjunction with, e.g., evaluations ordered by the radio access network as discussed above. These types of algorithms may be triggered even if ANDSF evaluations are not made in the network. Here the same mechanisms may apply as for ANDSF as described above. As the list of access links (points) that is sent by the UE to the network could have been the result of different access selection procedures (e.g. RAN specified conditions, ANDSF policies, connection management algorithms, etc.), in one embodiment of the disclosure, the UE indicates the reason for the inclusion of the access link in the report (e.g. using flags like "RAN", "ANDSF", etc.). This will help the 3GPP RAN to apply some priority depending on what mechanism triggered the inclusion of that particular access link in the report.

According to an embodiment of the disclosure, the priority level of each access link reported to the radio access network is either explicitly indicated using some scale (e.g. rate 0 meaning not preferred at all, and 10 meaning best preferred), or implicitly in the order in which the measurements for each access link are in the list that is included in the report (e.g. top of the list for the highest priorities, bottom of the list for the lowest priority).

According to an embodiment of the disclosure, the RAN can specify different thresholds for triggering that reports of access network evaluations are sent and these thresholds can be set differently, dependent on what access network it is. For example, the triggering condition for a certain SSID could be set to be x dBs lower than that of other SSIDs. Or a more detailed setting could be envisioned where the UE could scale the thresholds depending on the priority level (e.g. x dBs lower for the highest preferred AP's (SSIDs), x-y dBs lower for the medium preferred AP's (SSIDs), x dBs higher for non-preferred APs, etc).

According to an embodiment of the disclosure, the RAN can specify that the UE should report up to a maximum number of different access networks in report sent in, e.g., step 1250.

Exemplary UE

Figure 11:
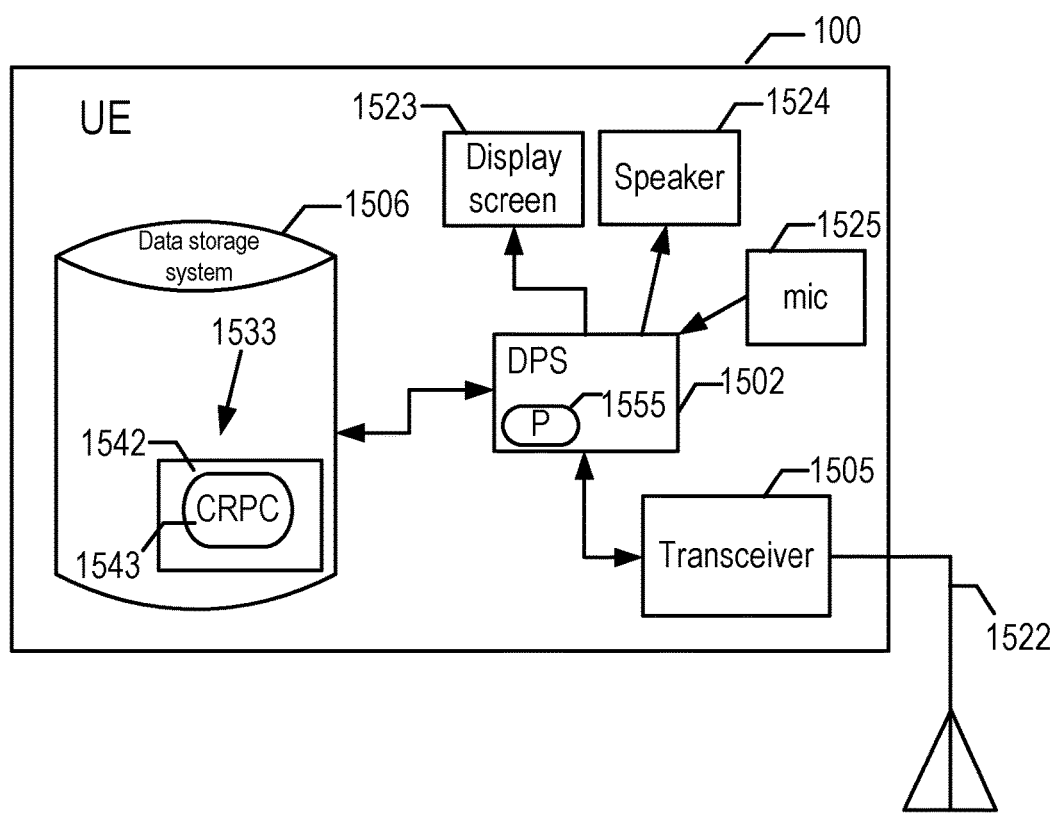
FIG. 11 illustrates a UE according to one embodiment of the present disclosure.

FIG. 11 illustrates a block diagram of an example UE 100. As shown in FIG. 11, UE 100 includes: a data processing system (DPS) 1502, which may include one or more processors (P) 1555 (e.g., microprocessors) and/or one or more circuits, such as an application specific integrated circuit (ASIC), Field-programmable gate arrays (FPGAs), etc.; a transceiver 1505, connected to an antenna 1522, for receiving messages from, and transmitting messages to, various access points; a data storage system 1506, which may include one or more computer-readable data storage mediums, such as non-transitory memory unit (e.g., hard drive, flash memory, optical disk, etc.) and/or volatile storage apparatuses (e.g., dynamic random access memory (DRAM)).

In embodiments where data processing system 1502 includes a processor 1555 (e.g., a microprocessor), a computer program product 1533 may be provided, which computer program product includes: computer readable program code 1543 (e.g., instructions), which implements a computer program, stored on a computer readable medium 1542 of data storage system 1506, such as, but not limited, to magnetic media (e.g., a hard disk), optical media (e.g., a DVD), memory devices (e.g., random access memory), etc. In some embodiments, computer readable program code 1543 is configured such that, when executed by data processing system 1502, code 1543 causes the data processing system 1502 to perform steps described herein (e.g., steps shown in FIGS. 5-10).

In some embodiments, UE 100 is configured to perform steps described above without the need for code 1543. For example, data processing system 1502 may consist merely of specialized hardware, such as one or more application-specific integrated circuits (ASICs). Hence, the features of the present invention described above may be implemented in hardware and/or software. For example, in some embodiments, the functional components of UE 100 described above may be implemented by data processing system 1502 executing program code 1543, by data processing system 1502 operating independent of any computer program code 1543, or by any suitable combination of hardware and/or software.

In a second embodiment, UE 406 further includes: 1) a display screen 1523 coupled to the data processing system 1502 that enables the data processing system 1502 to display information to a user of UE 100; 2) a speaker 1524 coupled to the data processing system 1502 that enables the data processing system 1502 to output audio to the user of UE 100; and 3) a microphone 1525 coupled to the data processing system 1502 that enables the data processing system 1502 to receive audio from the user.

Exemplary Radio Access Network (RAN) Controller

Figure 12:
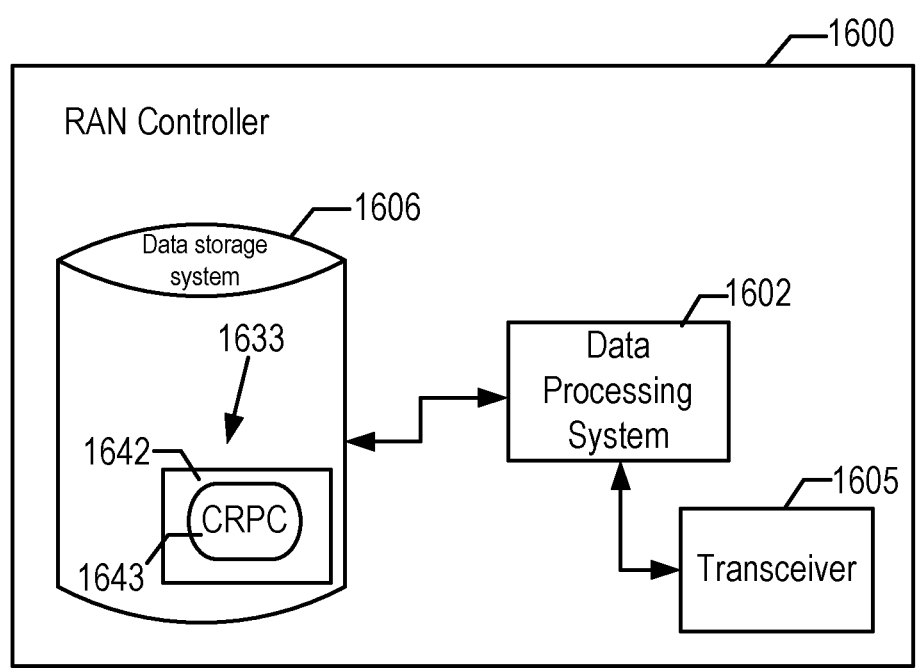
FIG. 12 illustrates a radio access network (RAN) controller according to one embodiment of the present disclosure.

FIG. 12 illustrates a block diagram of a RAN controller 1600 according to some embodiments. As noted above in an LTE or UMTS system, the RAN controller 1600 may be, for instance, located in an eNB, NB or radio network controller (RNC) of the RAN, respectively. As shown in FIG. 16, RAN controller 1600 may include: a data processing system 1602, which may include one or more processors (e.g., microprocessors) and/or one or more circuits, such as an application specific integrated circuit (ASIC), Field-programmable gate arrays (FPGAs), etc.; a transceiver 1605 for receiving message from, and transmitting messages to, another apparatus (e.g. a UE 100); a data storage system 1606, which may include one or more computer-readable data storage mediums, such as non-transitory data storage apparatuses (e.g., hard drive, flash memory, optical disk, etc.) and/or volatile storage apparatuses (e.g., dynamic random access memory (DRAM)). In embodiments where data processing system 1602 includes a processor (e.g., a microprocessor), a computer program product 1633 may be provided, which computer program product includes: computer readable program code 1643 (e.g., instructions), which implements a computer program, stored on a computer readable medium 1642 of data storage system 1606, such as, but not limited, to magnetic media (e.g., a hard disk), optical media (e.g., a DVD), memory devices (e.g., random access memory), etc. In some embodiments, computer readable program code 1643 is configured such that, when executed by data processing system 1602, code 1643 causes the data processing system 1602 to perform steps described herein (e.g., steps shown in FIG. 9 or 10). In some embodiments, RAN controller 1600 may be configured to perform steps described above without the need for code 1643. For example, data processing system 1602 may consist merely of specialized hardware, such as one or more application-specific integrated circuits (ASICs). Hence, the features of the present invention described above may be implemented in hardware and/or software.

By applying the disclosure according to the embodiments described, both the problems that was described earlier, that of maintaining a network controlled access selection as well as introducing a radio performance related aspect in the evaluation before selection of access for a UE is made, is achieved. It should be noted that the algorithm in the network should still allow for a user to include, e.g., its home Wi-Fi and always select that when in range, independent of the network algorithm. The network algorithm for selection of access should not interfere with user preferences.

Although the present disclosure have been described with examples a communication system compliant to the 3GPP specified LTE standard specification, it should be noted that the solutions presented may be equally well applicable to any other mobile communication technology (e.g., UMTS) in combination with a wireless local area network (e.g. according to the 802.11 specifications). The specific embodiments should therefore be considered exemplary rather than limiting the scope of the disclosure, which rather is to be defined by the following claims.

While various aspects and embodiments of the present disclosure have been described above, it should be understood that they have been presented by way of example only, and not limitation. Thus, the breadth and scope of the present disclosure should not be limited by any of the above described exemplary embodiments. Moreover, any combination of the elements described in this disclosure in all possible variations thereof is encompassed by the disclosure unless otherwise indicated herein or otherwise clearly contradicted by context.

Additionally, while the processes described herein and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method of operating a wireless communication device (WCD) to facilitate selection among a set of two or more radio access networks (RANs), each of which can provide data access to the WCD, the wireless communication device being served by one of the RANs in the set, the method comprising:

receiving, at the WCD, a network selection policy;

evaluating, by the WCD, the network selection policy, wherein evaluating the network selection policy comprises the WCD using the network selection policy to make a policy evaluation, wherein using the network selection policy to make the policy evaluation comprises the WCD selecting, based on the network selection policy, a single particular RAN from said set of RANs that can provide data access to the WCD, wherein selecting a single particular RAN based on the network selection policy comprises selecting a single particular RAN based on at least one or more of: the current time of day, the current location of the WCD, a signal strength threshold, a signal quality threshold, and load information indicating load at each RAN in the set of RANs; and before attempting to access the single particular RAN selected from said set of RANs that can provide data access to the WCD based on the network selection policy:

the WCD transmitting to the RAN serving the WCD a message pertaining to the policy evaluation, said message comprising information identifying the single particular RAN selected from said set of RANs that can provide data access to the WCD based on the network selection policy, wherein the message pertaining to the policy evaluation further comprises one or more of: a signal strength of each RAN in said set of RANs, a signal quality of each RAN in said set of RANs, and the load information indicating load at each RAN in the set of RANs;

the WCD receiving a response to the message, wherein the response indicates whether the WCD's policy evaluation has been rejected, and the network selection policy is an Access Network Discovery and Selection Function (ANDSF) policy; and the WCD receiving a message from the RAN serving the WCD, the message requesting information about one or more of the set of RANs and indicating a criterion on when to perform the step of evaluating.

2. The method of claim 1, wherein the ANDSF policy identifies a selection priority among the RANS included in said set of RANs.

3. The method of claim 1, further comprising receiving, at the WCD, information transmitted by the RAN serving the WCD, said information concerning the selection of a RAN for the WCD.

4. The method of claim 3, further comprising:
the WCD determining, based on the response, whether the WCD's policy evaluation has been rejected; and
as a result of the WCD determining that the WCD's policy evaluation has not been rejected, the WCD attempting to access the RAN selected based on the network selection policy.

5. The method of claim 3, wherein
the response indicates that the WCD's policy evaluation has been rejected, and
the response further comprises information indicating one or more conditions that are to be satisfied before the WCD is permitted to access the RAN selected based on the network selection policy.

6. The method of claim 5, further comprising:
the WCD monitoring the one or more conditions;
the WCD determining that the one or more conditions are satisfied; and
the WCD, as a result of determining that the one or more conditions are satisfied, accessing the RAN selected based on the network selection policy.

7. The method of claim 1, wherein the criterion indicates that the step of evaluating should not be started until a certain time or until a property of one or more of the set of RANs reaches a threshold.

8. The method of claim 1, further comprising:
determining whether the criterion for performing the step of evaluating is satisfied;
if the criterion is satisfied, obtaining the information requested in the message; and
transmitting the obtained information to the RAN serving the WCD along with the information indicating the result of the evaluation of the network selection policy.

9. A wireless communication device (WCD), comprising:
a transceiver for communicating with a radio access network (RAN) serving the WCD and receiving a network selection policy from a server; and
one or more processors configured to evaluate the network selection policy, wherein the one or more processors are configured to evaluate the network selection policy by using the network selection policy to make a policy evaluation, wherein using the network selection policy to make the policy evaluation comprises selecting, based on the network selection policy, a single particular RAN from a set of two or more RANs, each of which can provide data access to the WCD, wherein selecting a single particular RAN based on the network selection policy comprises selecting a single particular RAN based on at least one or more of: the current time of day, the current location of the WCD, a signal strength threshold, a signal quality threshold, and load information indicating load at each RAN in the set of RANs; and
the one or more processors are configured such that, before attempting to access the single particular RAN selected from said set of RANs that can provide data access to the WCD based on the network selection policy, the one or more processors:
employ the transceiver to transmit to the RAN serving the WCD a message pertaining to the policy evaluation, said message comprising information identifying the single particular RAN selected from said set of RANs that can provide data access to the WCD based on the network selection policy, wherein the message pertaining to the policy evaluation further comprises one or more of: a signal strength of each RAN in said set of RANs, a signal quality of each RAN in said set of RANs, and the load information indicating load at each RAN in the set of RANs;
employ the transceiver to obtain a response to the message, wherein the response indicates whether the WCD's policy evaluation has been rejected; and
employ the transceiver to receive a message from the RAN serving the WCD, the message requesting information about one or more of the set of RANs and indicating a criterion on when to perform the evaluation.

10. The WCD of claim 9, wherein the network selection policy is an Access Network Discovery and Selection Function (ANDSF) policy from an ANDSF server.

11. The WCD of claim 9, the transceiver being further operable to receive information from the RAN serving the WCD concerning the selection of a RAN for the WCD.

12. The WCD of claim 11, wherein the one or more processors are further configured to:
determine, based on the response, whether the WCD's policy evaluation has been rejected; and
as a result of the determination that the WCD's policy evaluation has not been rejected, attempt to access the RAN selected based on the network selection policy.

13. The WCD of claim 12, wherein the one or more processors are further configured to:
as a result of the determination that the WCD's policy evaluation has been rejected, determine whether the response comprises an indication of another RAN to access;
as a result of the determination that the response comprises the indication of another RAN to access, access said another RAN; and
as a result of the determination that the response does not comprise the indication of another RAN, continue to access the RAN serving the WCD.

14. The WCD of claim 11, wherein the response indicates that the WCD's policy evaluation has been rejected, and
the response further comprises information indicating one or more conditions that are to be satisfied before the WCD is permitted to access the RAN selected based on the network selection policy.

15. The WCD of claim 14, wherein the one or more processors are further configured to:
monitor the one or more conditions;
determine that the one or more conditions are satisfied; and
as a result of the determination that the one or more conditions are satisfied, access the RAN selected based on the network selection policy.

* * * * *